(12) United States Patent
Cox et al.

(10) Patent No.: US 7,899,298 B2
(45) Date of Patent: Mar. 1, 2011

(54) FIBER OPTIC DROP TERMINAL MOUNTING PLATE

(75) Inventors: Terry Dean Cox, Keller, TX (US);
Diana Rodriguez, Alvarado, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/684,318

(22) Filed: Jan. 8, 2010

(65) Prior Publication Data
US 2010/0107399 A1     May 6, 2010

Related U.S. Application Data

(62) Division of application No. 11/788,269, filed on Apr. 17, 2007, now Pat. No. 7,664,360.

(51) Int. Cl.
*G02B 6/00*     (2006.01)

(52) U.S. Cl. .................. 385/135; 385/134; 174/50; 254/134.4

(58) Field of Classification Search .......... 385/135; 174/50; 254/134.3 R, 134.3 PA
See application file for complete search history.

(56) References Cited

U.S. PATENT DOCUMENTS

| | | | |
|---|---|---|---|
| 4,013,254 A | 3/1977 | Boundy et al. | 248/243 |
| 5,109,467 A | 4/1992 | Hogan et al. | 385/135 |
| 5,260,957 A | 11/1993 | Hakimi et al. | 372/39 |
| 5,838,858 A | 11/1998 | White | 385/76 |
| 5,870,910 A | 2/1999 | Specht | 70/58 |
| 5,881,200 A | 3/1999 | Burt | 385/142 |
| 6,201,921 B1 | 3/2001 | Quesnel et al. | 385/135 |
| 6,275,639 B1 | 8/2001 | Bolt et al. | 385/135 |
| 6,577,801 B2 | 6/2003 | Broderick et al. | 385/125 |
| 6,661,961 B1 | 12/2003 | Allen et al. | 385/135 |
| 6,710,366 B1 | 3/2004 | Lee et al. | 257/14 |

(Continued)

FOREIGN PATENT DOCUMENTS

FR     2856827     3/1987

(Continued)

OTHER PUBLICATIONS

Corning Cable Systems, Figures 23 and 5 from SRP-009-005, Issue 1, Jun. 1994.

(Continued)

*Primary Examiner*—Ryan Lepisto
(74) *Attorney, Agent, or Firm*—John H. Vynalek

(57) ABSTRACT

There is provided fiber drop terminal ("FDT") assemblies for providing selective connections between optical fibers of distribution cables and optical fibers of drop cables, such as in multiple dwelling units. The FDT assemblies include a mounting plate that enables the FDT to be conveniently and securely mounted to a generally vertical surface, such as a wall. The mounting plate is structured such that the base of the FDT must be removed before the mounting plate can be removed, and the cover of the FDT is structured that neither the base nor the mounting plate can be removed without first removing the cover. The cover may be selectively locked to the base and/or mounting plate with a locking fastener; therefore, only technicians able to remove the locking fastener may remove the cover, base, and/or mounting plate of the FDT assembly.

7 Claims, 42 Drawing Sheets

U.S. PATENT DOCUMENTS

| | | | |
|---|---|---|---|
| 6,721,484 B1 | 4/2004 | Blankenship et al. | 385/135 |
| 6,738,554 B2 | 5/2004 | Daoud et al. | 385/135 |
| 6,788,871 B2 * | 9/2004 | Taylor | 385/135 |
| 6,909,834 B2 | 6/2005 | Tomino et al. | 385/135 |
| 6,968,107 B2 | 11/2005 | Belardi et al. | 385/127 |
| 7,016,590 B2 | 3/2006 | Tanaka et al. | 385/135 |
| 7,054,513 B2 | 5/2006 | Herz et al. | 385/12 |
| 7,346,253 B2 * | 3/2008 | Bloodworth et al. | 385/135 |
| 7,477,824 B2 * | 1/2009 | Reagan et al. | 385/134 |
| 2001/0036351 A1 | 11/2001 | Fritz | 385/135 |
| 2005/0021392 A1 | 1/2005 | English et al. | 705/12 |
| 2005/0094959 A1 * | 5/2005 | Sibley et al. | 385/135 |
| 2005/0213921 A1 | 9/2005 | Mertesdorf et al. | 385/135 |
| 2006/0093303 A1 | 5/2006 | Reagan et al. | 385/135 |
| 2006/0153516 A1 * | 7/2006 | Napiorkowski et al. | 385/135 |
| 2006/0263029 A1 | 11/2006 | Mudd et al. | 385/135 |
| 2007/0237484 A1 * | 10/2007 | Reagan et al. | 385/134 |
| 2008/0219631 A1 * | 9/2008 | Gronvall et al. | 385/135 |
| 2008/0219633 A1 | 9/2008 | Smith et al. | 385/135 |

FOREIGN PATENT DOCUMENTS

| | | |
|---|---|---|
| FR | 2630607 | 10/1989 |
| GB | 2230177 | 10/1990 |
| JP | 62-27312 | 2/1987 |
| WO | WO2005/050277 | 6/2005 |
| WO | WO2005/088373 | 9/2005 |
| WO | WO2006/050505 | 5/2006 |
| WO | WO2006/135524 | 12/2006 |

OTHER PUBLICATIONS

PennWell Corporation, "Bringing Fiber to the multi-dwelling unit", reprinted with revisions to format, from the Oct. 2005 edition of Cabling Installation & Maintenance, Copyright 2005.

Corning Cable Systems LLC, Product Information Sheet, OptiTect™ Premier Local Convergence Cabinet, An Evolant© Solutions Product, Sep. 2006, 6 pages.

FONS, Fiber Optic Network Solutions, "Fiber Distribution Terminals", Fiber Access Terminals, Copyright© FONS Corp. 2005, www.fons.com, 3 pages.

FONS, Fiber Optic Network Solutions, "Indoor Fiber Distribution Terminal", "Interior Wall Mount Terminals", Copyright© FONS Corp. 2005, www.fons.com, 3 pages.

ADC Spec Sheet "OmniReach™ FTTX Solutions", "Outdoor Fiber Distribution Terminal 24 (OFDT-24)", 103335AE, 1/07 Revision © 2006, 2007 www.adc.com, 4 pages.

ADC Spec Sheet "OmniReach™ FTTX Solutions", "Indoor Fiber Distribution Terminal", 103266AE, Aug. 2006 Revision © 2006 www.adc.com, 4 pages.

ADC Catalog "OmniReach™ FTTP Solutions", "Fiber Distribution Terminals", "FTTP Infrastructure Solutions", "Fiberglass In-Ground Mounting Sleeve", "Above Ground Cabinet Mounting", "Pad or Pole Mounting", "Accessories", 1276550 Apr. 2004, Revision © 2003, 2004 www.adc.com, 12 pages.

Emerson product sheet, "NetSpan™ Fiber Distribution Hub Fiber Cross-Connect Enclosure", "Outside Plant for Business Continuity", © 2006 Emerson Network Power Energy Systems, North America, www.EmersonNetworkPower.com/EnergySystems.Com, 2 pages.

SPC TelEquip product sheet, "FiberGard Distribution Terminal 48 Fiber-Indoor/Outdoor", "The compact solution for fiber provisioning", www.spc.net/2005/Fiber%/20Optics%20FiberGard%20Dist%20Term%2048.html.

Hitachi Cable Review No. 24 "Low-loss Holey Fiber", Aug. 2005, 5 pages.

Draka Comteq / Optical Fibre, issue Date: Aug. 2006, Supercedes: -/-, "BendBright $^{xs}$ Single Mode Optical Fibre, Enhanced low macrobending sensitive, low water peak fibre, Product Type: G.652D, Coating Type: ColorLock™ and Natural", www.drakafibre.com | www.draka.com, 2 pages.

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

* cited by examiner

FIBER OPTIC DROP TERMINAL MOUNTING PLATE

RELATED APPLICATIONS

The present application is a Divisional of U.S. Ser. No. 11/788,269 filed on Apr. 17, 2007, which has issued as U.S. Pat. No. 7,664,360, the disclosure of which is incorporated by reference herein in its entirety.

BACKGROUND OF THE INVENTION

1. Field of the Invention

The present invention is related to fiber drop terminals, and more particularly, to fiber drop terminals for mounting upon walls or other vertical surfaces.

2. Description of Related Art

To provide improved performance to subscribers, fiber optic networks are increasingly providing optical fiber connectivity directly to the subscribers. As part of various fiber-to-the-premises (FTTP), fiber-to-the-home (FTTH), and other initiatives (generally described as FTTx), such fiber optic networks are providing the optical signals from distribution cables through local convergence points ("LCPs") to fiber optic cables, such as drop cables, that are run directly or indirectly to the subscribers' premises. Such optical connectivity is increasingly being provided to multiple dwelling units ("MDUs") in part because of the relatively large density of subscribers located in an MDU.

MDUs include apartments, condominiums, townhouses, dormitories, hotels/motels, office buildings, factories, and any other collection of subscriber locations that are in relatively close proximity to one another. MDUs typically are all provided in a single indoor environment, such as an office or condominium; however, MDUs may also include a plurality of individual structures, such as apartment complexes. Typically, if an MDU comprises multiple structures, the optical fibers extending between the structures are adapted for outdoor environments, whereas the optical fibers extending within the structures are adapted for indoor environments. Most conventional MDUs include an LCP located in a generally central and selectively accessible location, such as the basement, utility closet, or the like, or the LCP may be located outside the MDU on an exterior wall, in a pedestal, in a handhole, or the like. The LCP includes at least one fiber optic cable that optically connects to a distribution cable. The LCP also includes a connection point where the subscriber cables routed through the building are optically connected to the distribution cable.

In some situations the subscriber drop cables are not run directly back to the LCP, but to a fiber drop terminal (also called a fiber distribution terminal) ("FDT"). FDTs are commonly used in MDUs to provide optical connectivity between riser cables (generally oriented vertically in the MDU) and the plenum cables (generally oriented horizontally in the MDU). However, such FDTs are large and are generally not desirable for installation on each floor or other section of an MDU based upon the size of their footprint, visibility, and other considerations. Such large FDTs are also relatively expensive to produce and are generally less convenient to transport, install, and service.

Therefore, a need exists for FDTs that provide a require relatively small area and/or volume and that provide convenient access for technicians. In addition, a need exists for FDTs that provide convenient and secure access to the optical connections within the FDT. Furthermore, a need exists for FDTs that are conveniently and securely mounted to wall or other vertical surfaces.

BRIEF SUMMARY OF THE INVENTION

The various embodiments of the present invention address the above needs and achieve other advantages by providing fiber drop terminals ("FDTs") assemblies that include a mounting plate that allows an FDT to be conveniently mounted to a generally vertical surface, such as a wall, and that secures the FDT from unauthorized access into the FDT. The cover, base, and mounting plate are structured and arranged to form an interlocking relationship such that the cover must be removed from the base and/or mounting plate before the base may be removed from the mounting plate and both the cover and base must be removed before the mounting plate may be dismounted. Therefore, securing the cover with a locking fastener or other similar device will enable the entire FDT assembly to be secured against unauthorized access.

One embodiment of the present invention comprises a mounting plate adapted for use with FDTs, wherein the mounting plate is selectively mountable to a generally vertical surface and is adapted to selectively receive the FDT. The mounting plate comprises a first surface adapted to selectively engage the FDT. The first surface includes at least one retention device to enable the FDT to be selectively retained by the mounting plate. The mounting plate also comprises at least one fastening portion joined to the first surface. The fastening portion enables the mounting plate to be selectively fastened to the generally vertical surface. Furthermore, the mounting plate is structured and arranged to prevent dismounting of the mounting plate without prior removal of at least a portion of the FDT, such as the base and/or cover, from the mounting plate.

Further embodiments of the present invention include FDT assemblies with mounting plates of the type described above, and still further embodiments of the present invention provide methods for installing FDT assemblies. Therefore, the present invention satisfies the needs FDTs that can be conveniently and securely mounted to generally vertical surfaces.

BRIEF DESCRIPTION OF THE SEVERAL VIEWS OF THE DRAWINGS

Figure 1:
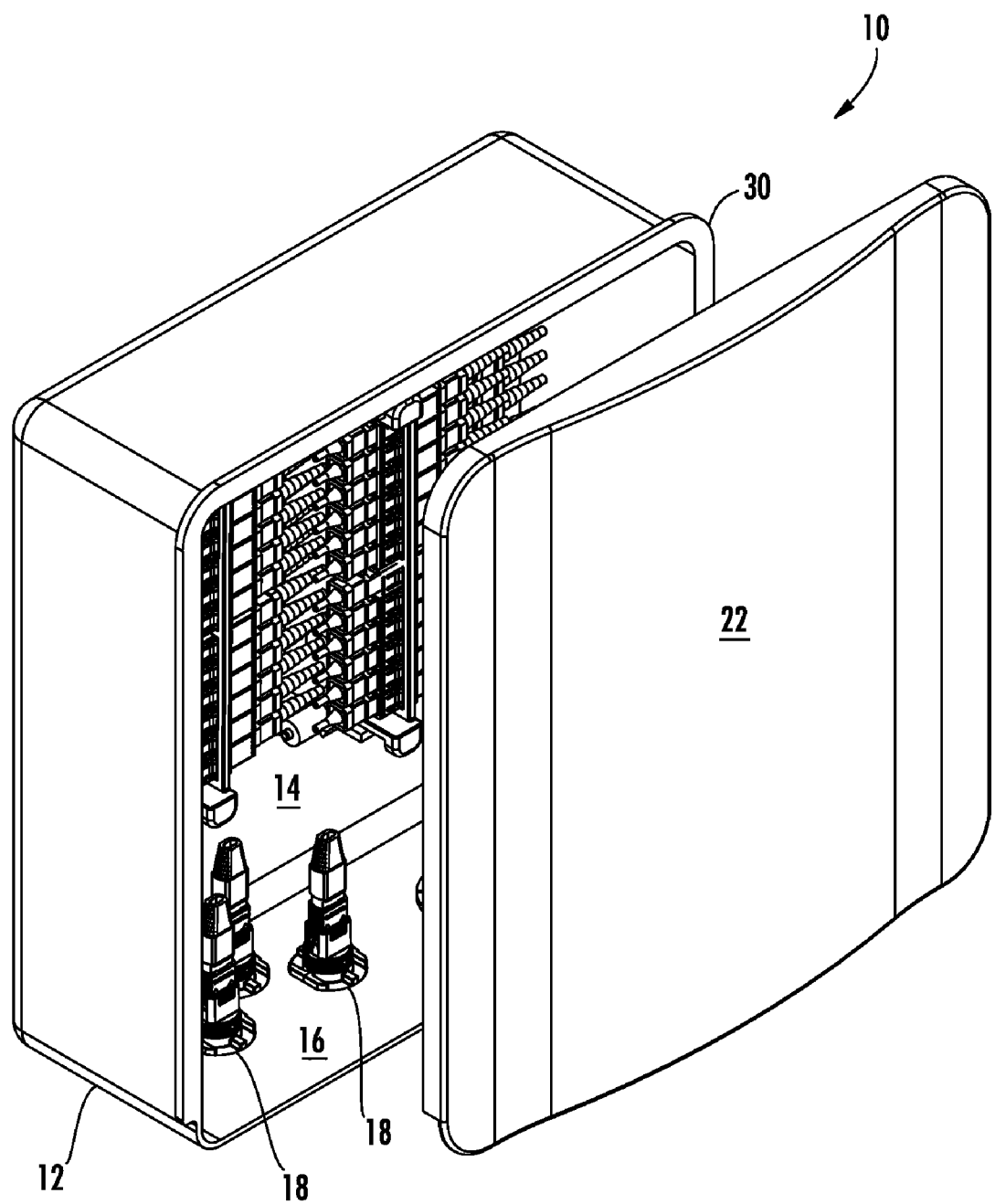
Figure 2:
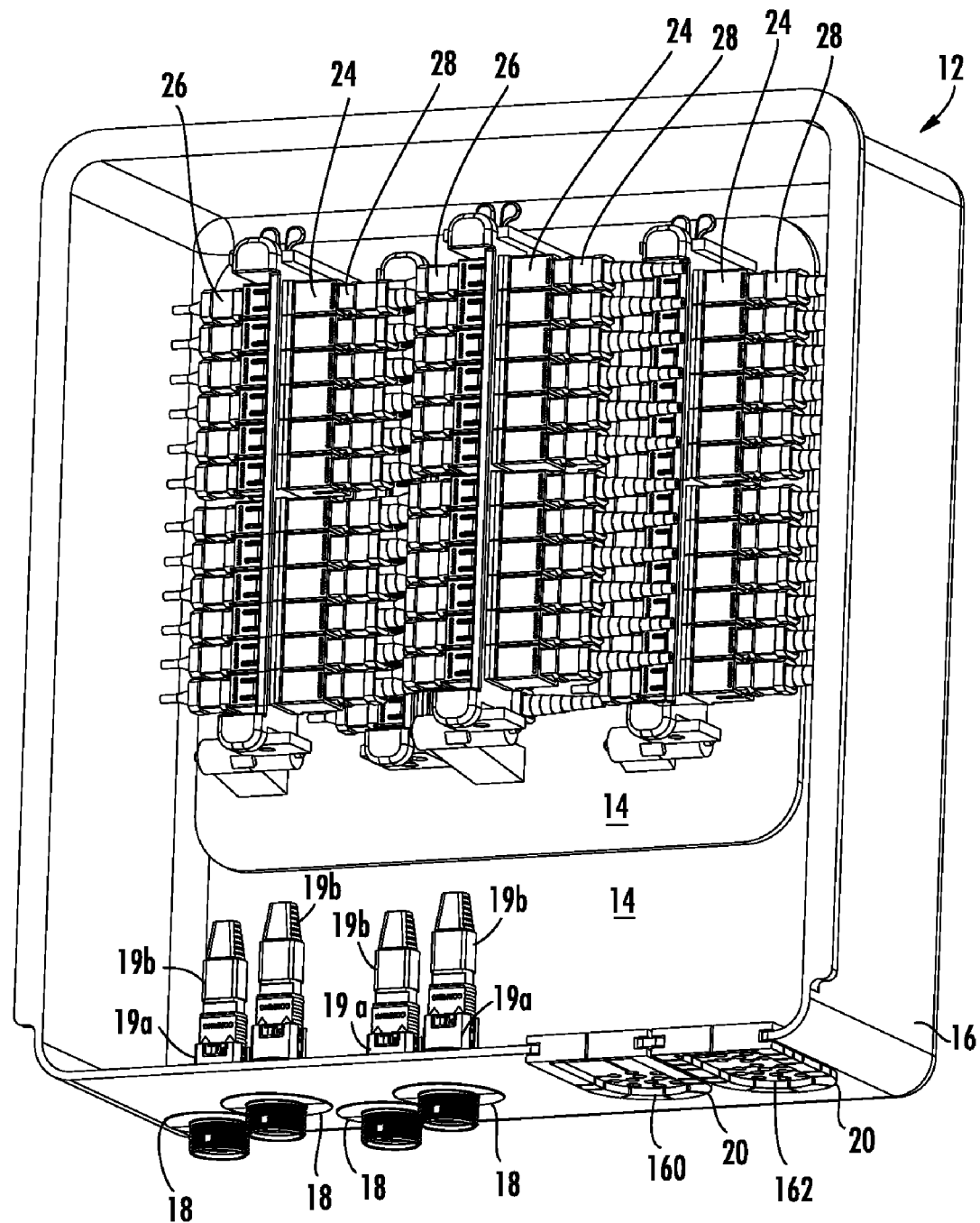
Figure 3:
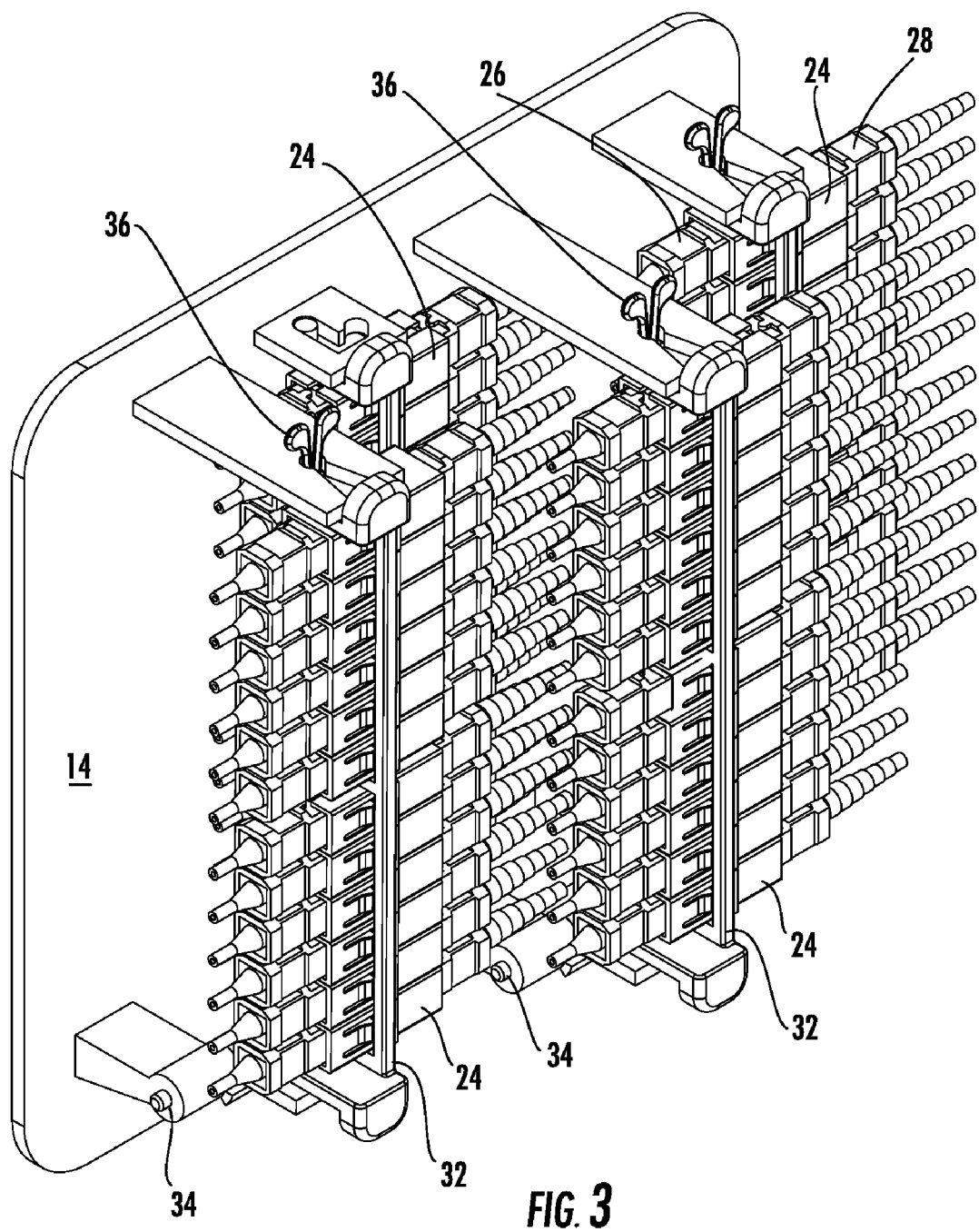
Figure 4:
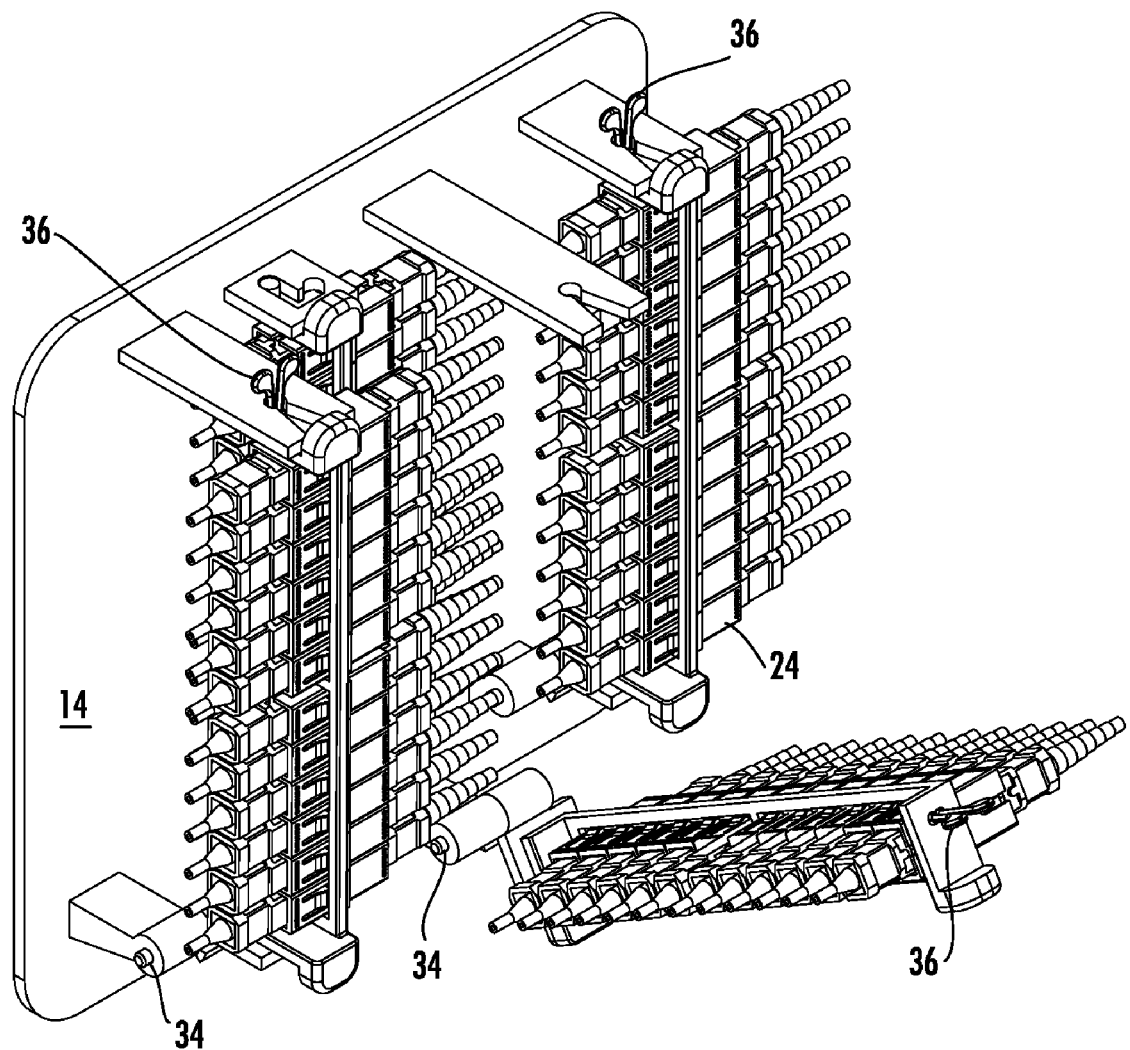
Figure 5:
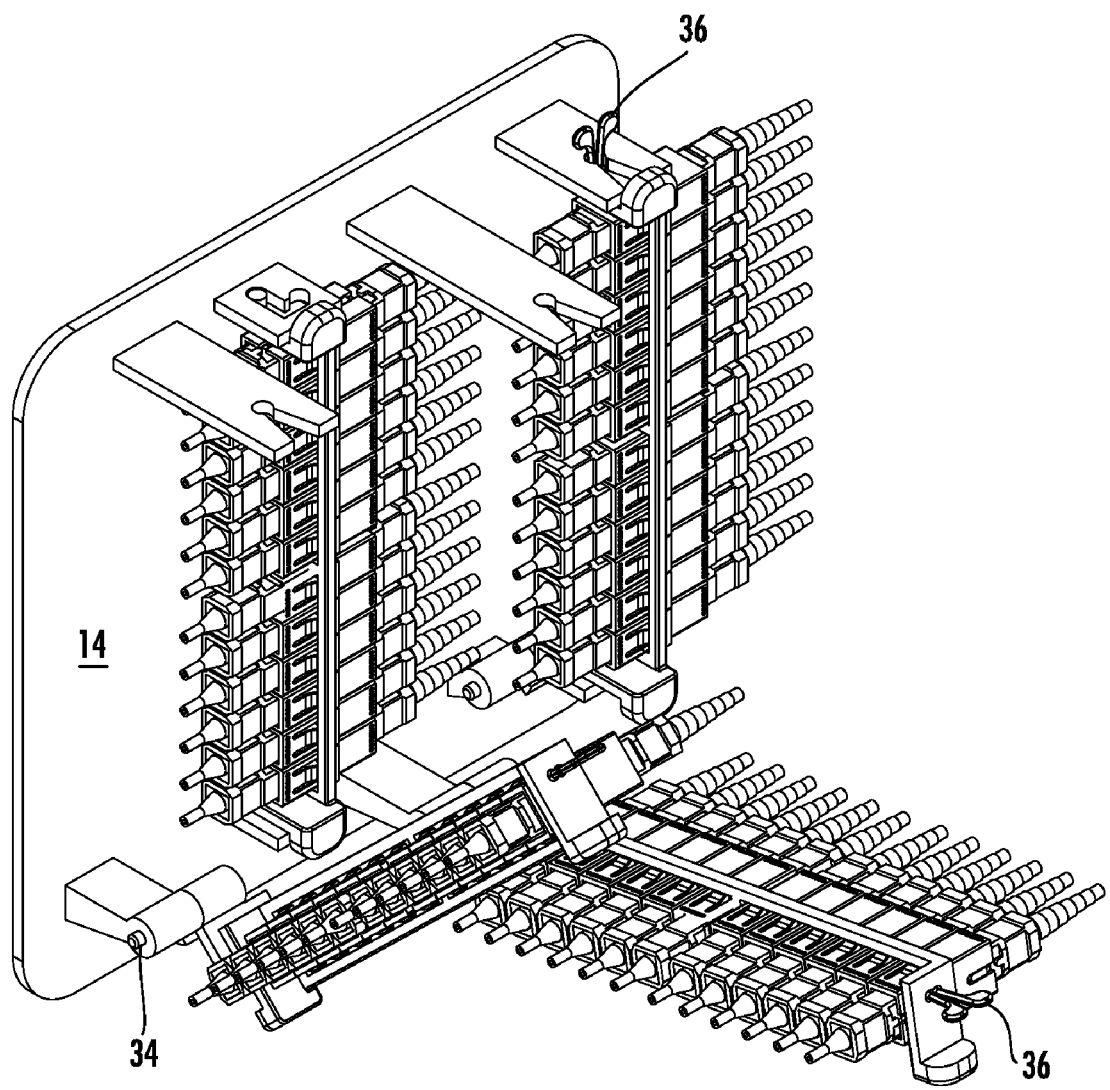
Figure 6:
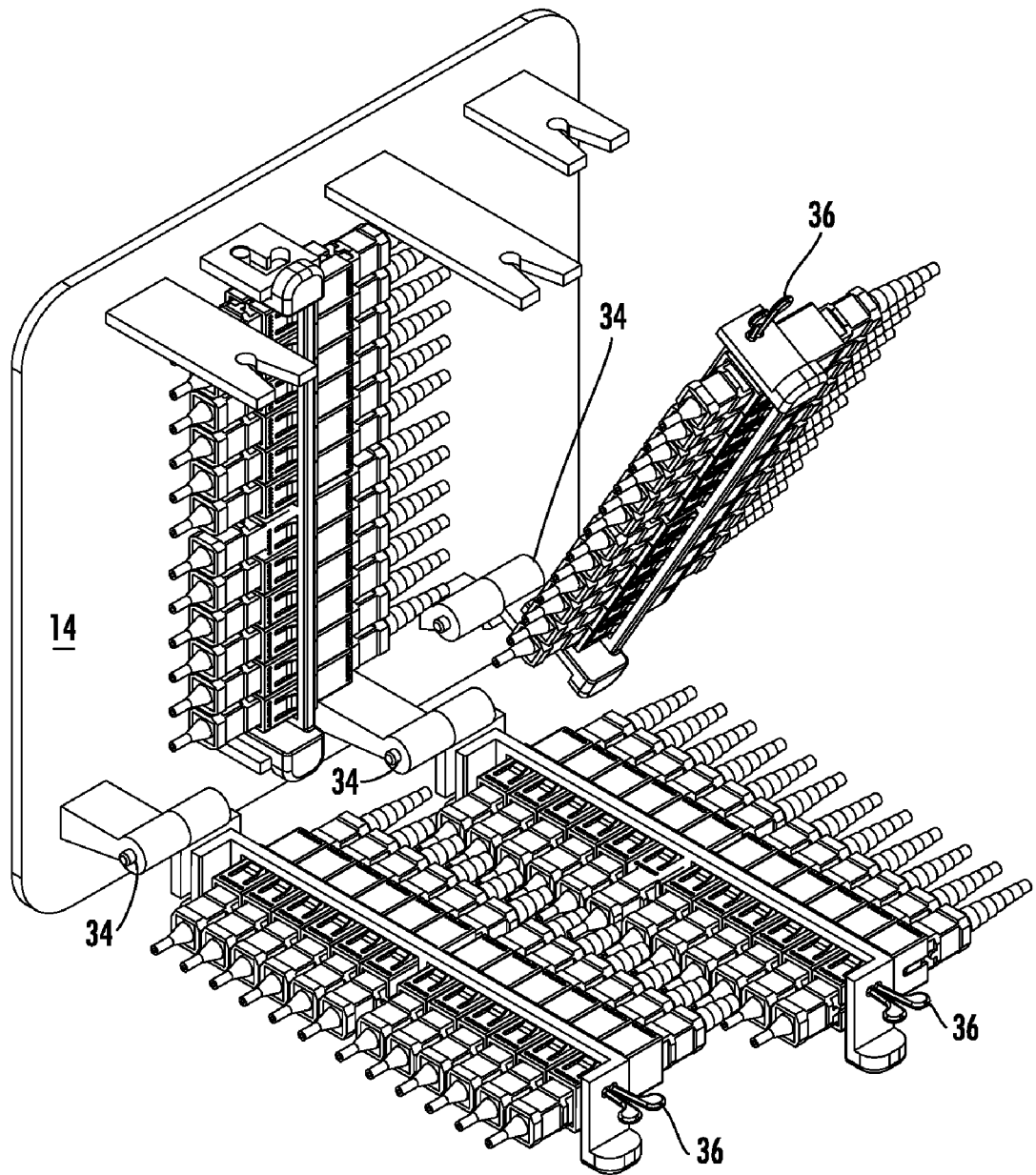
Figure 7:
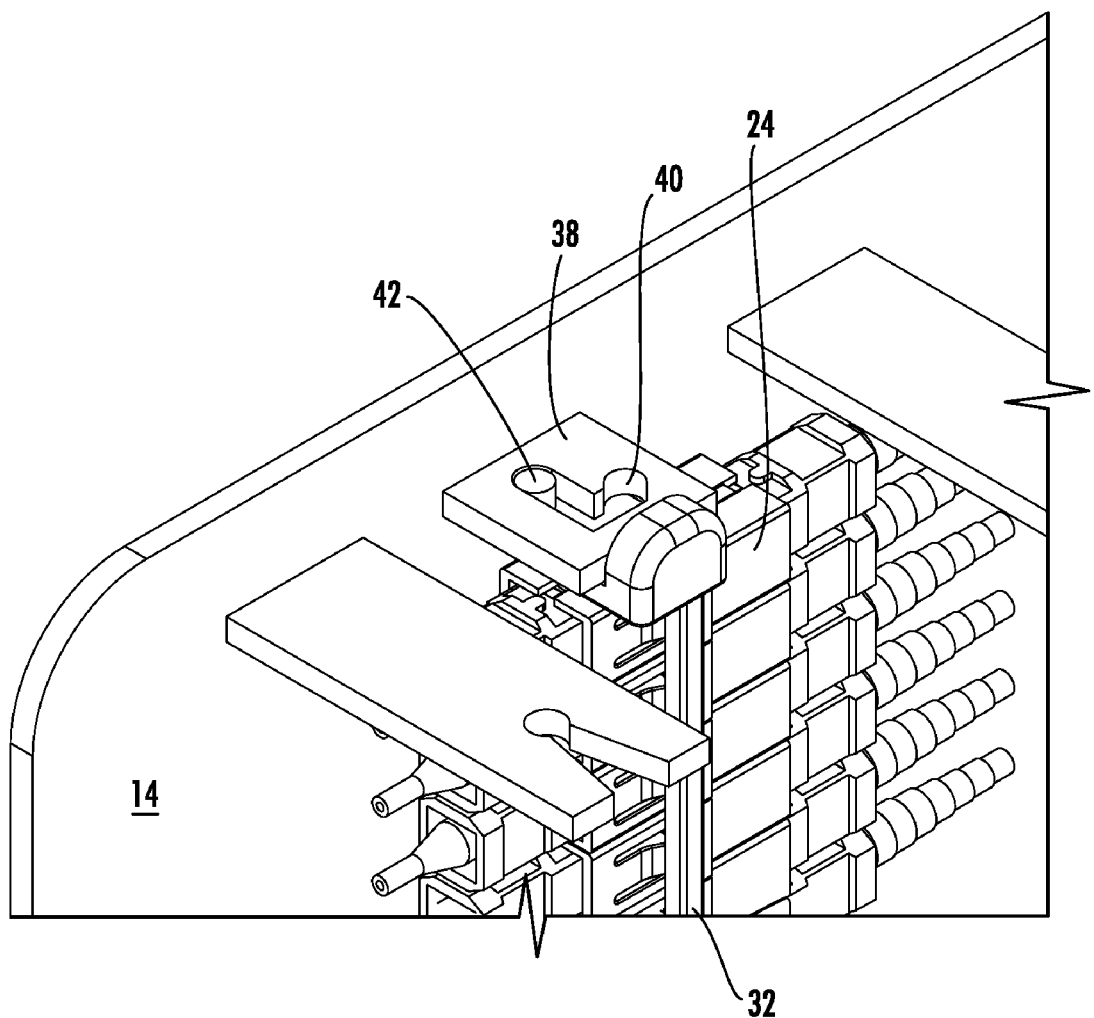
Figure 8:
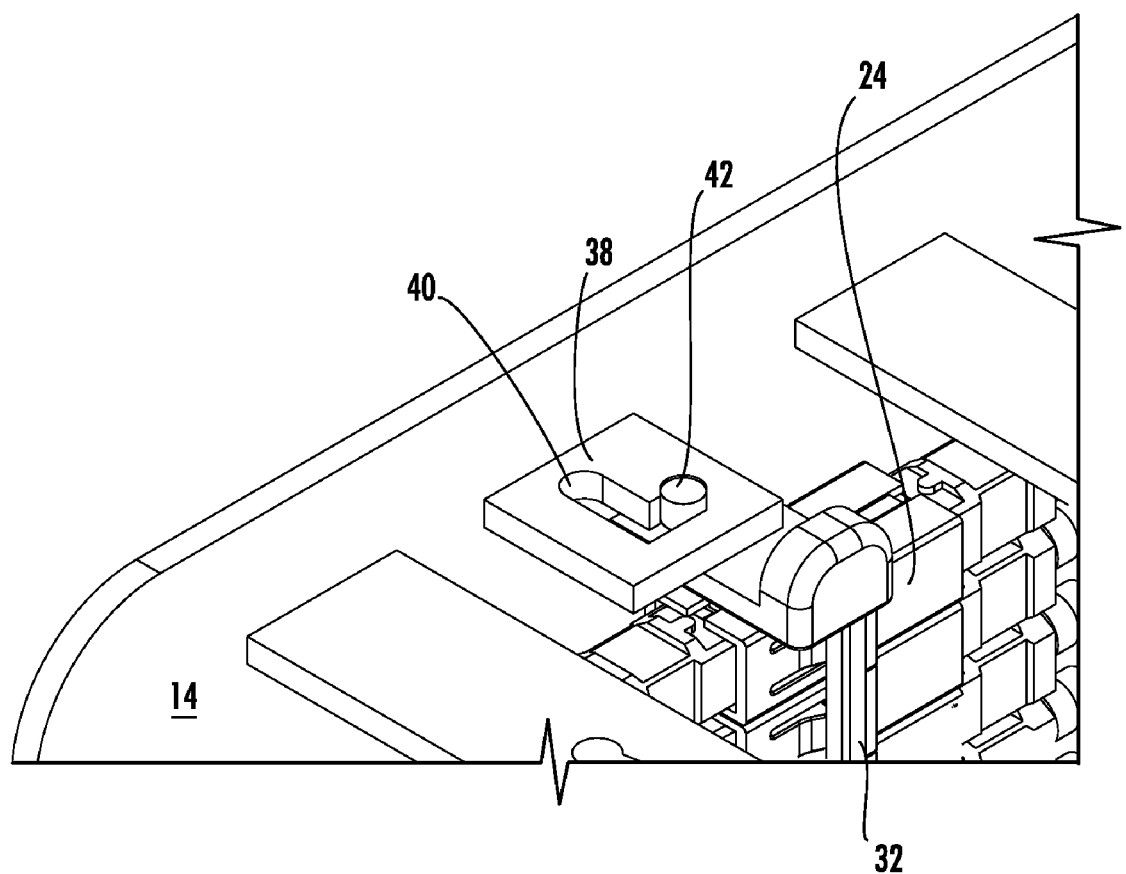
Figure 9:
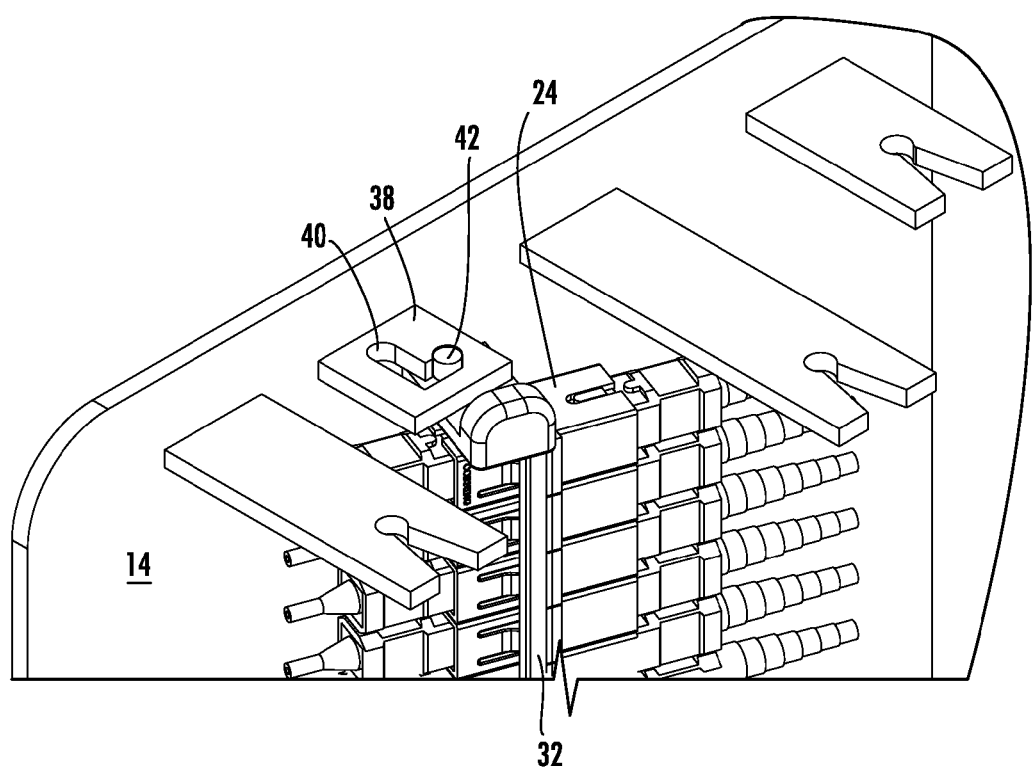
Figure 10:
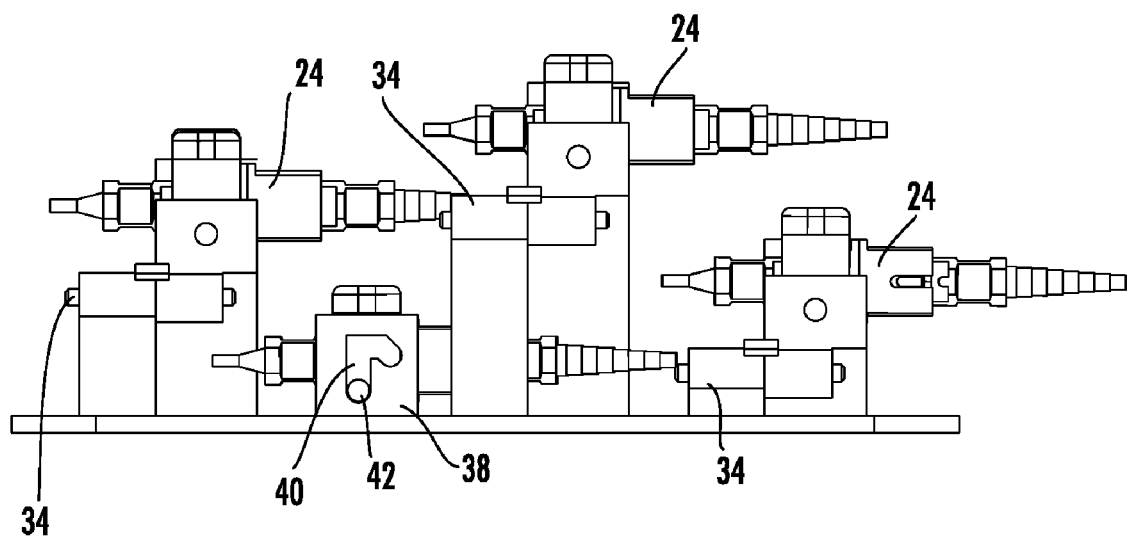
Figure 11:
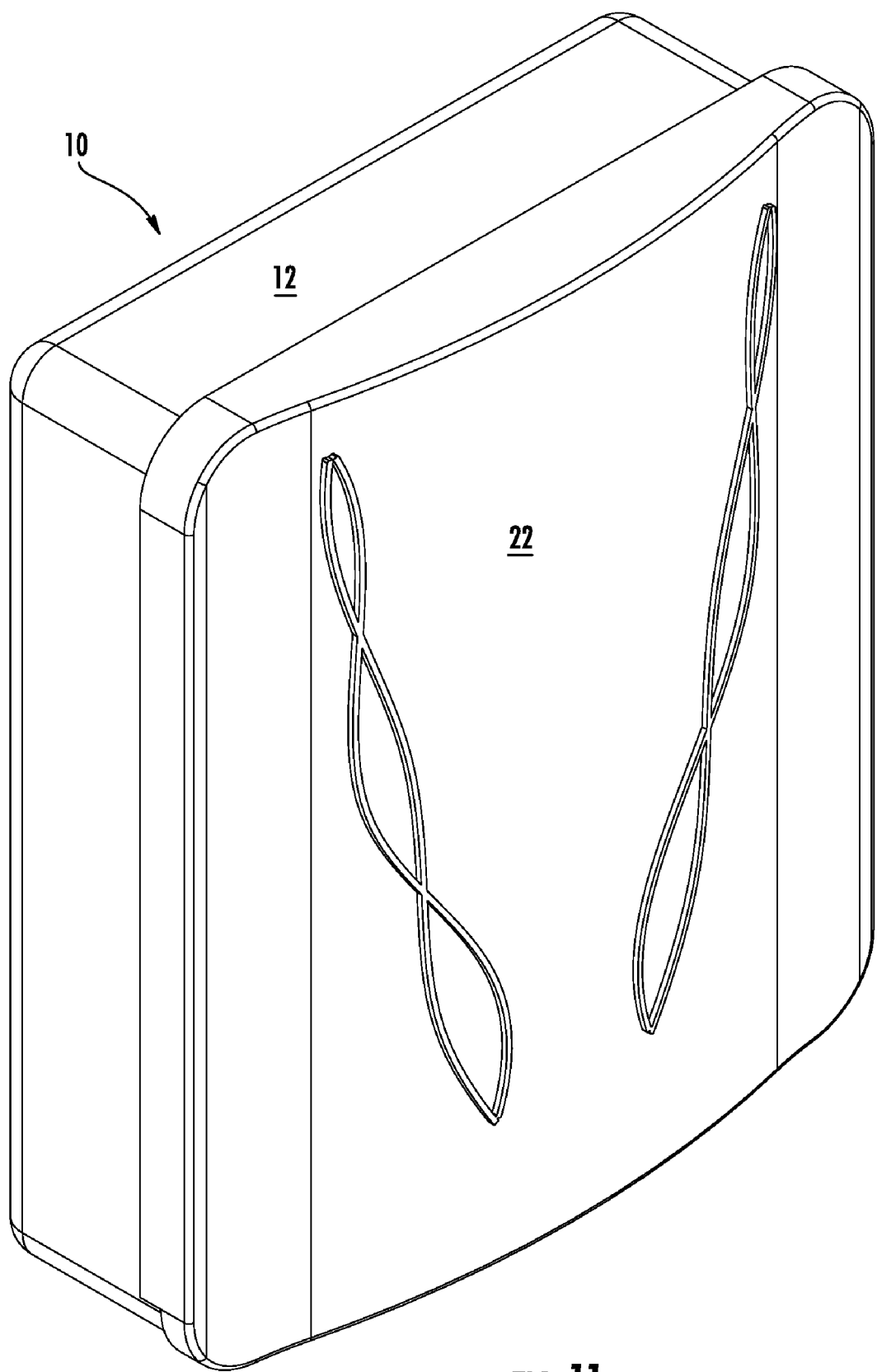
Figure 12:
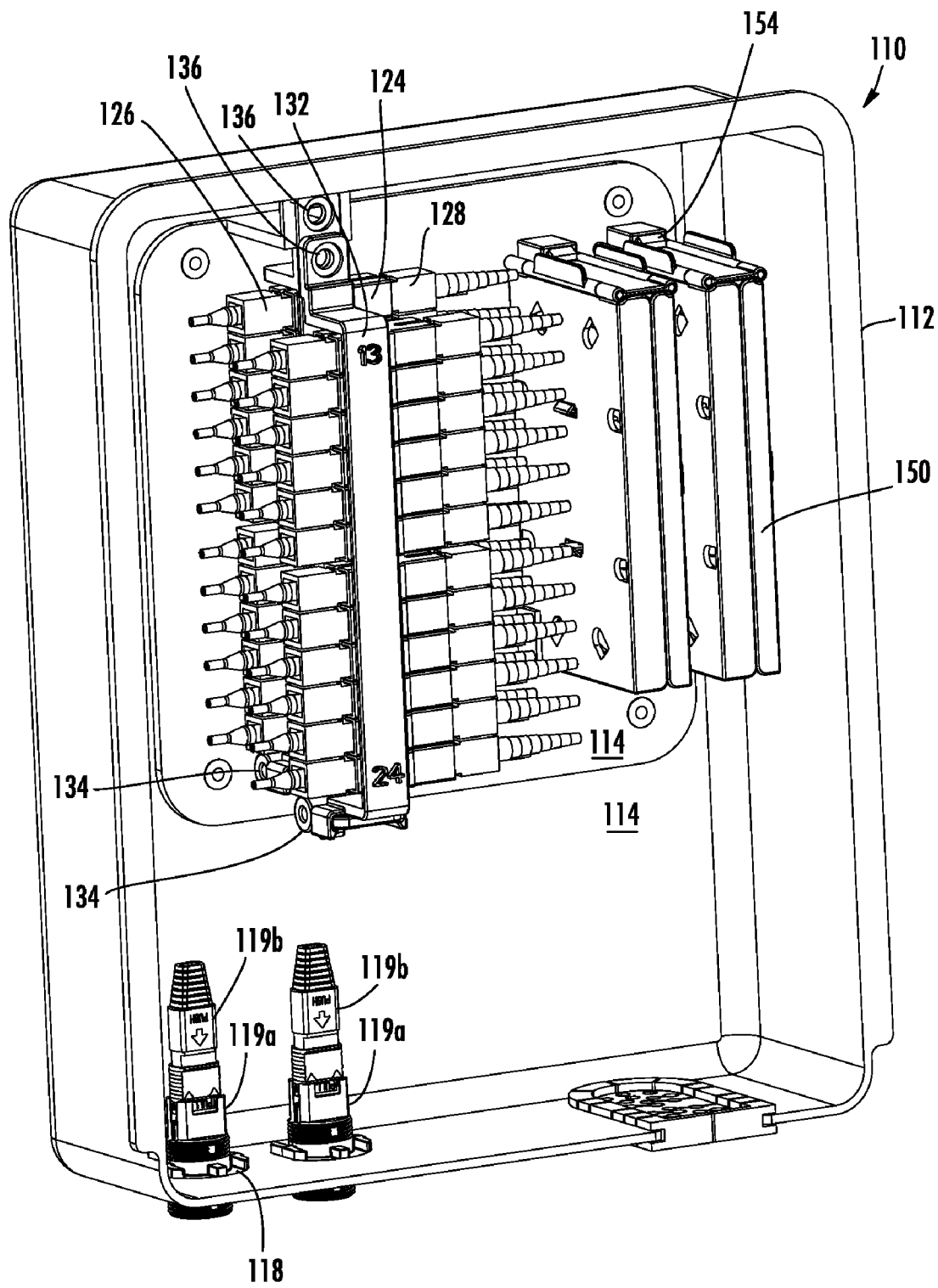
Figure 13:
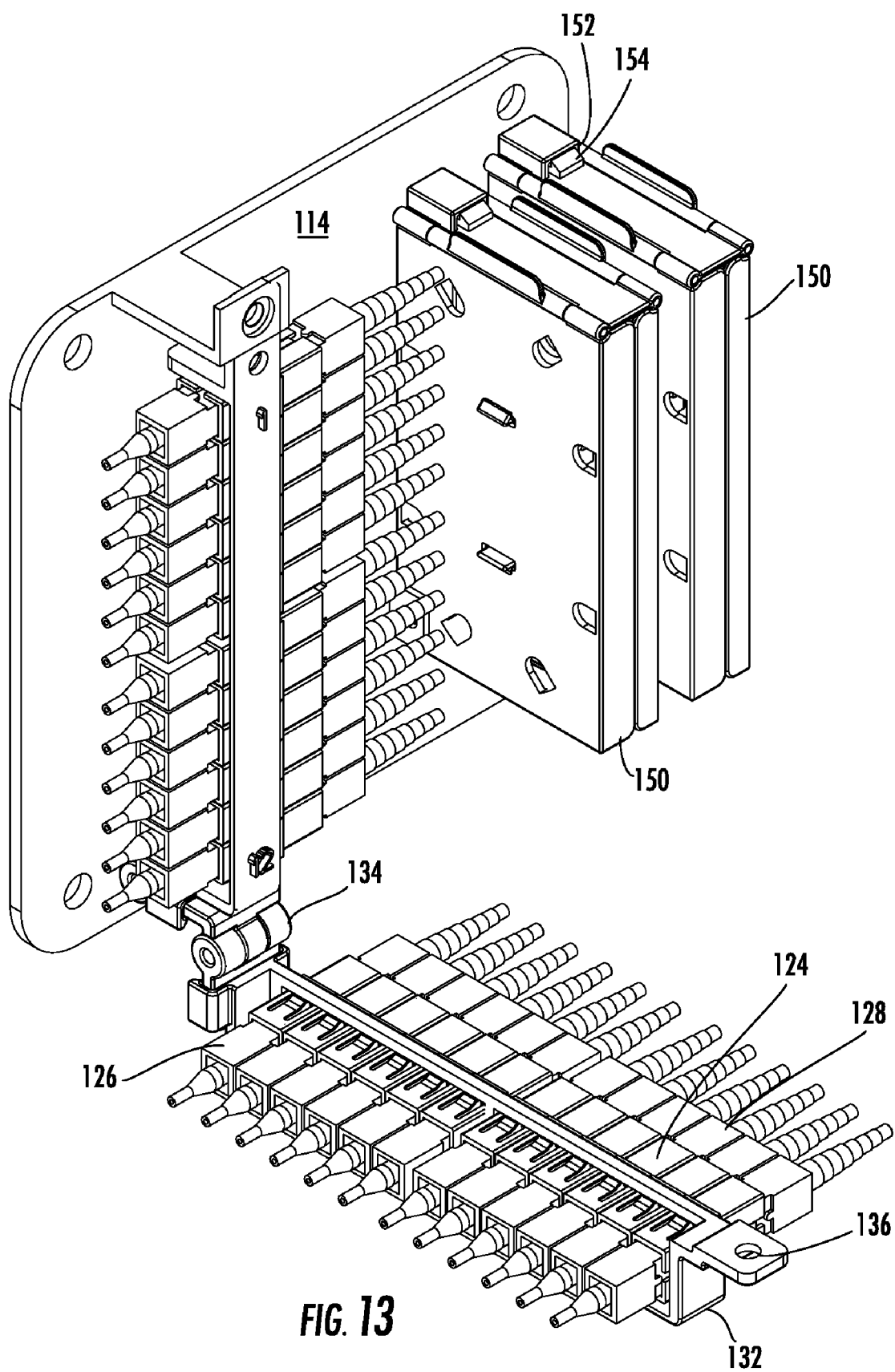
Figure 14:
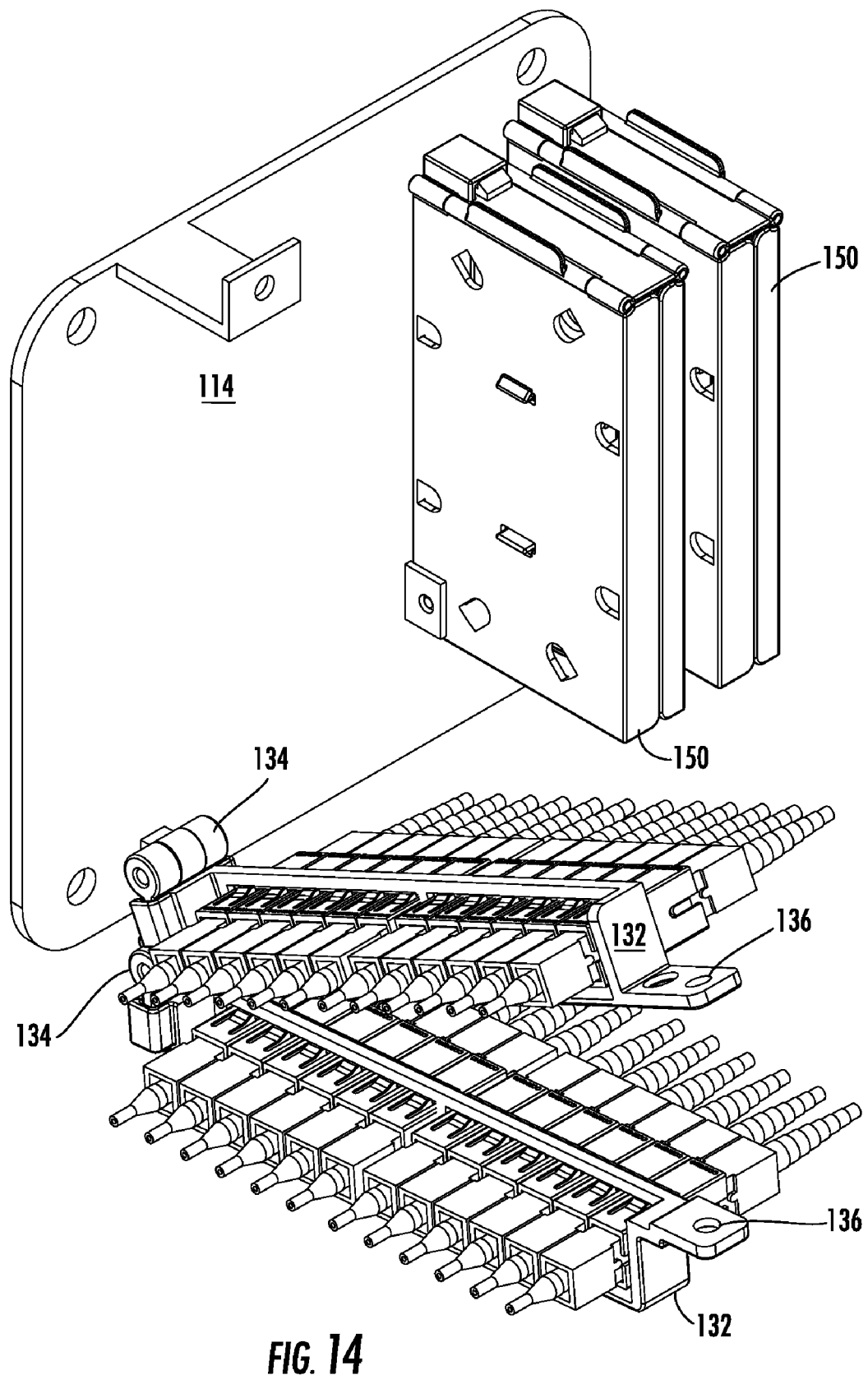
Figure 15:
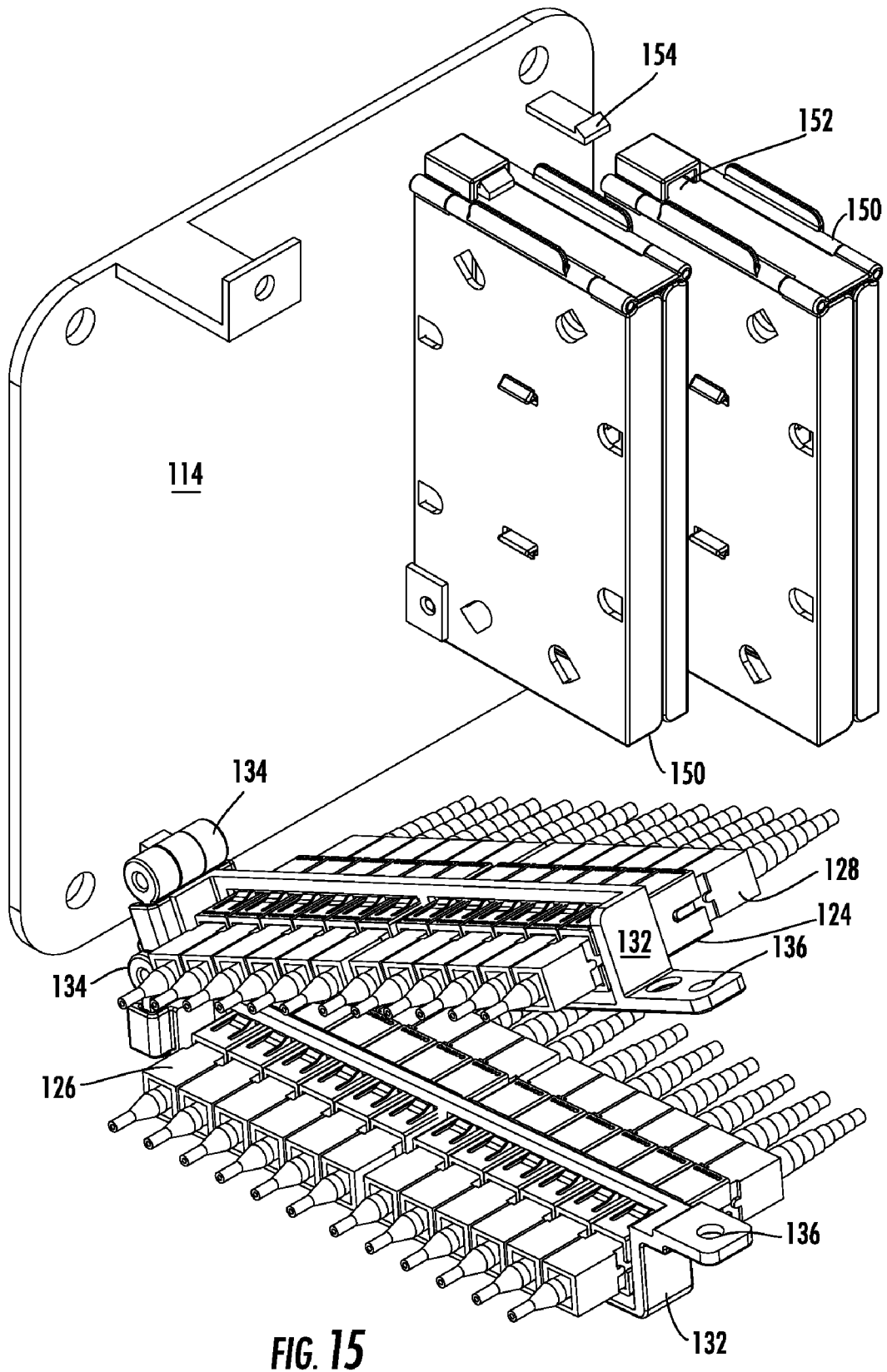
Figure 16:
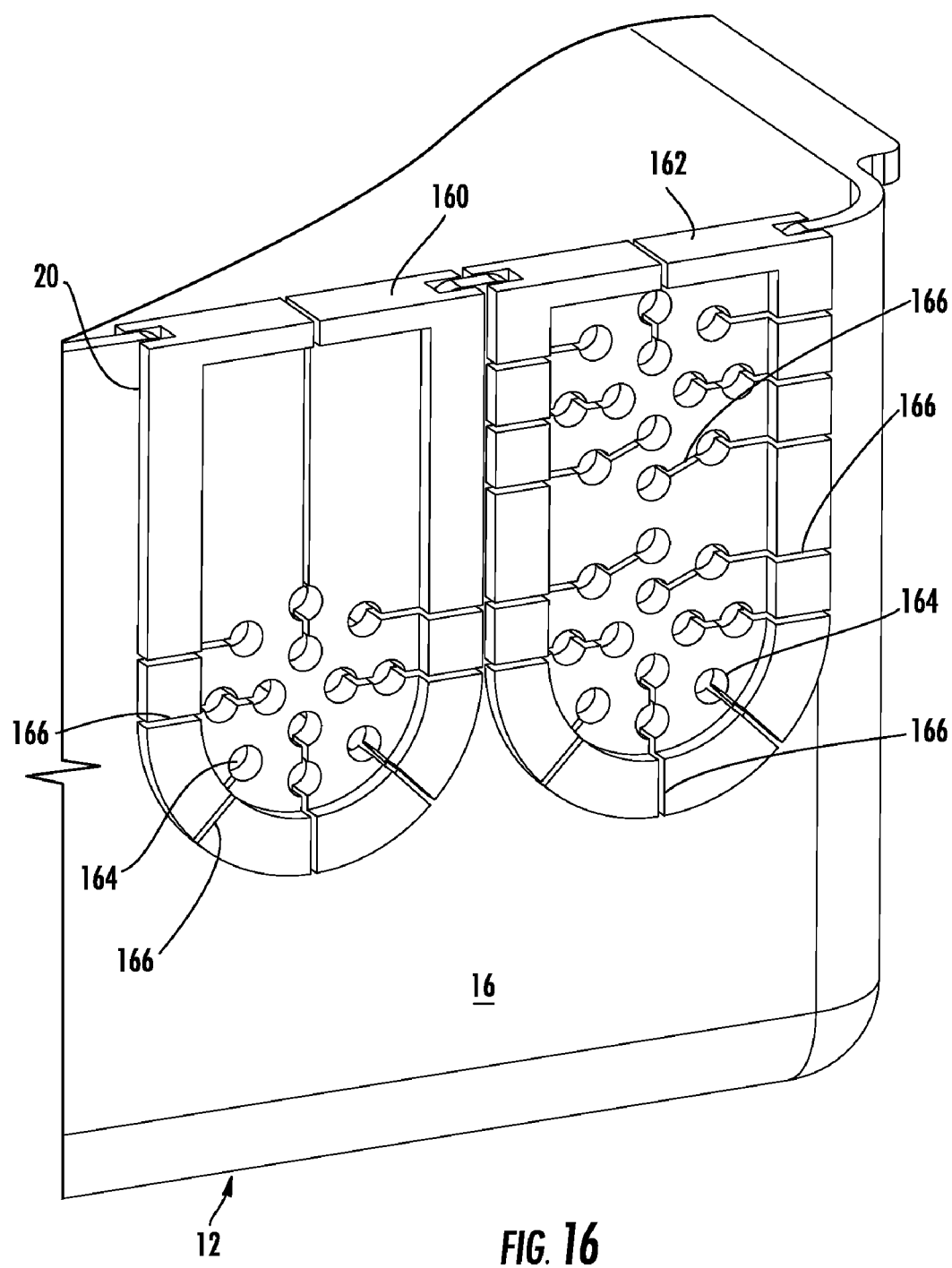
Figure 17:
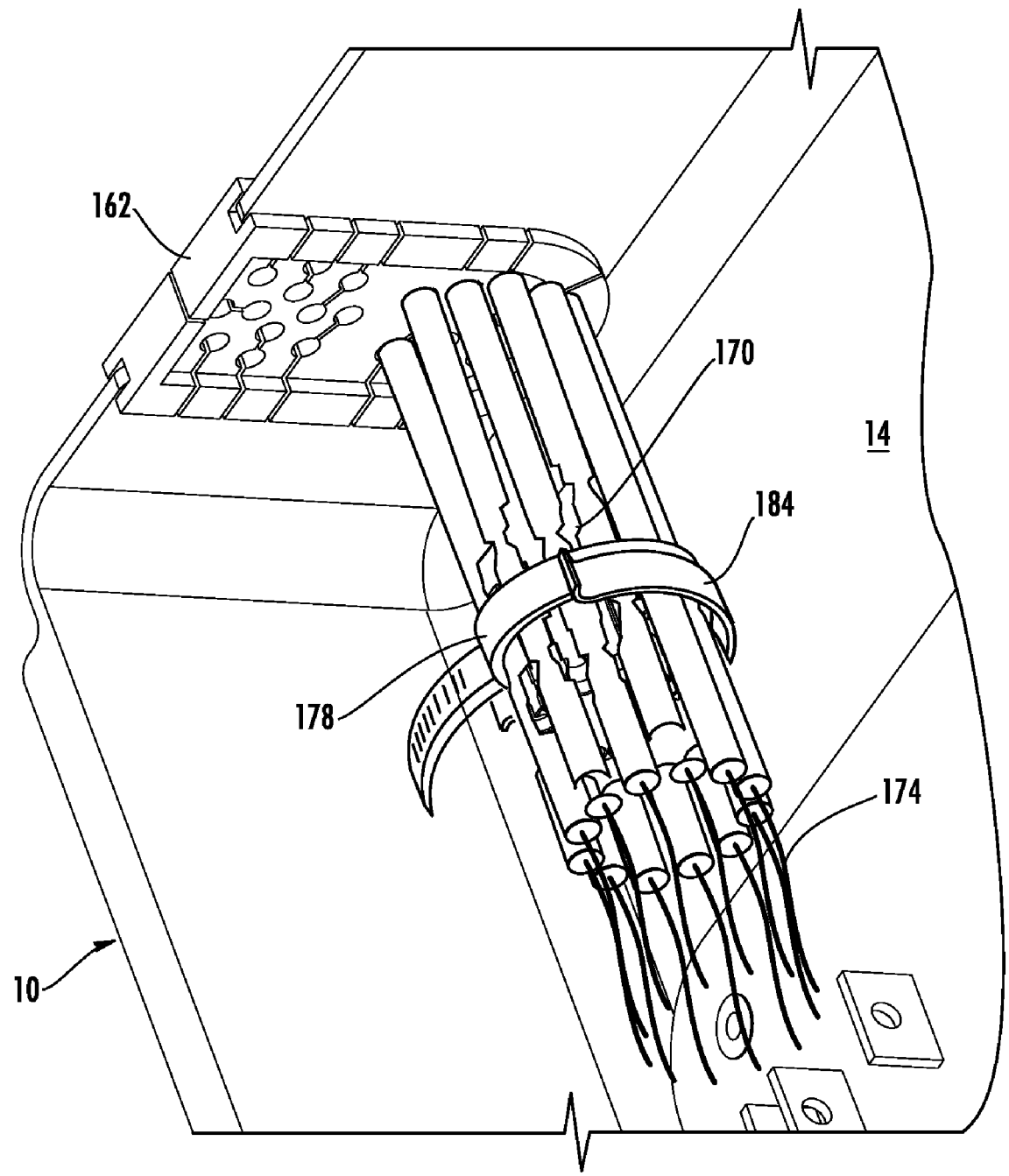
Figure 18:
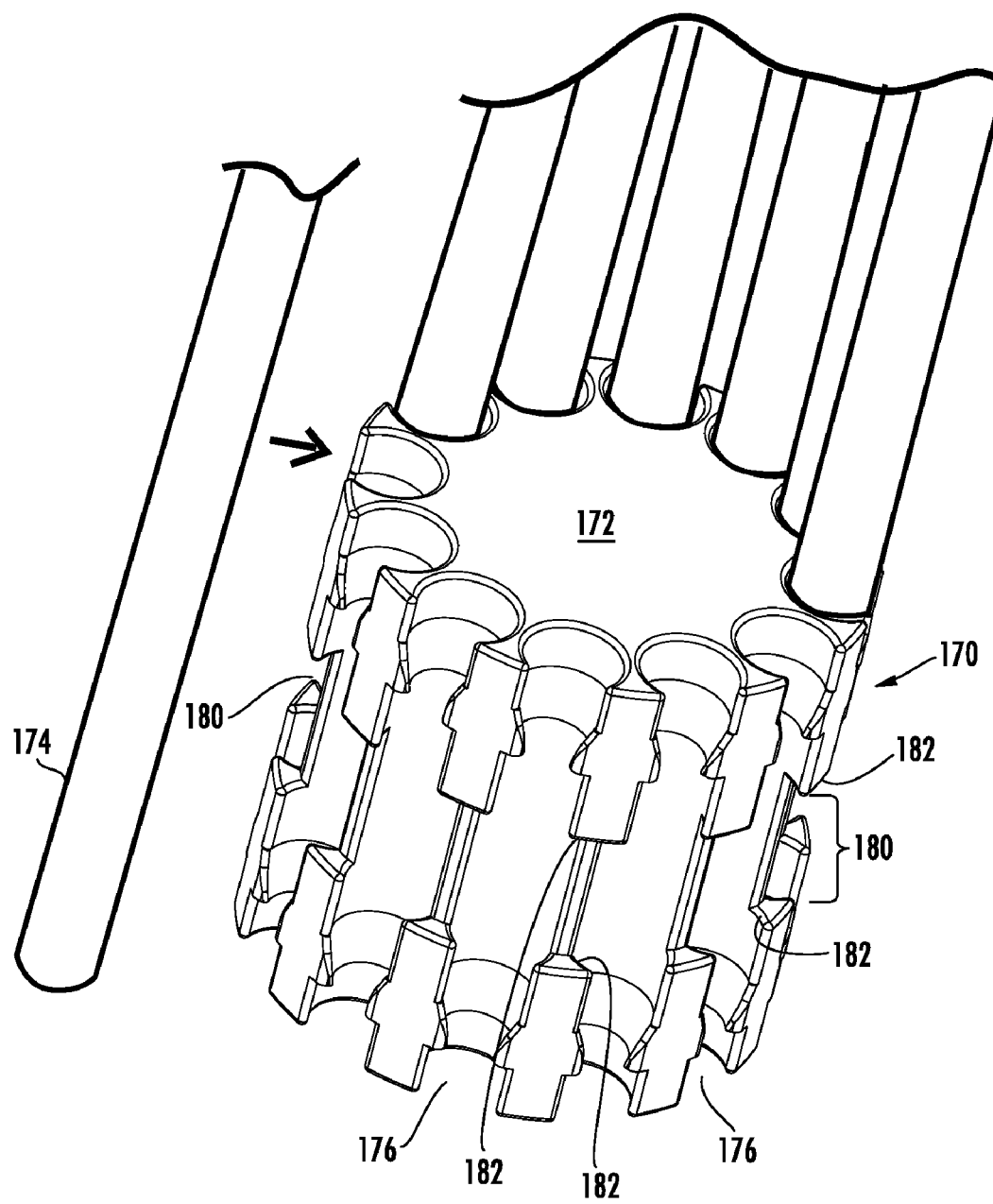
Figure 19:
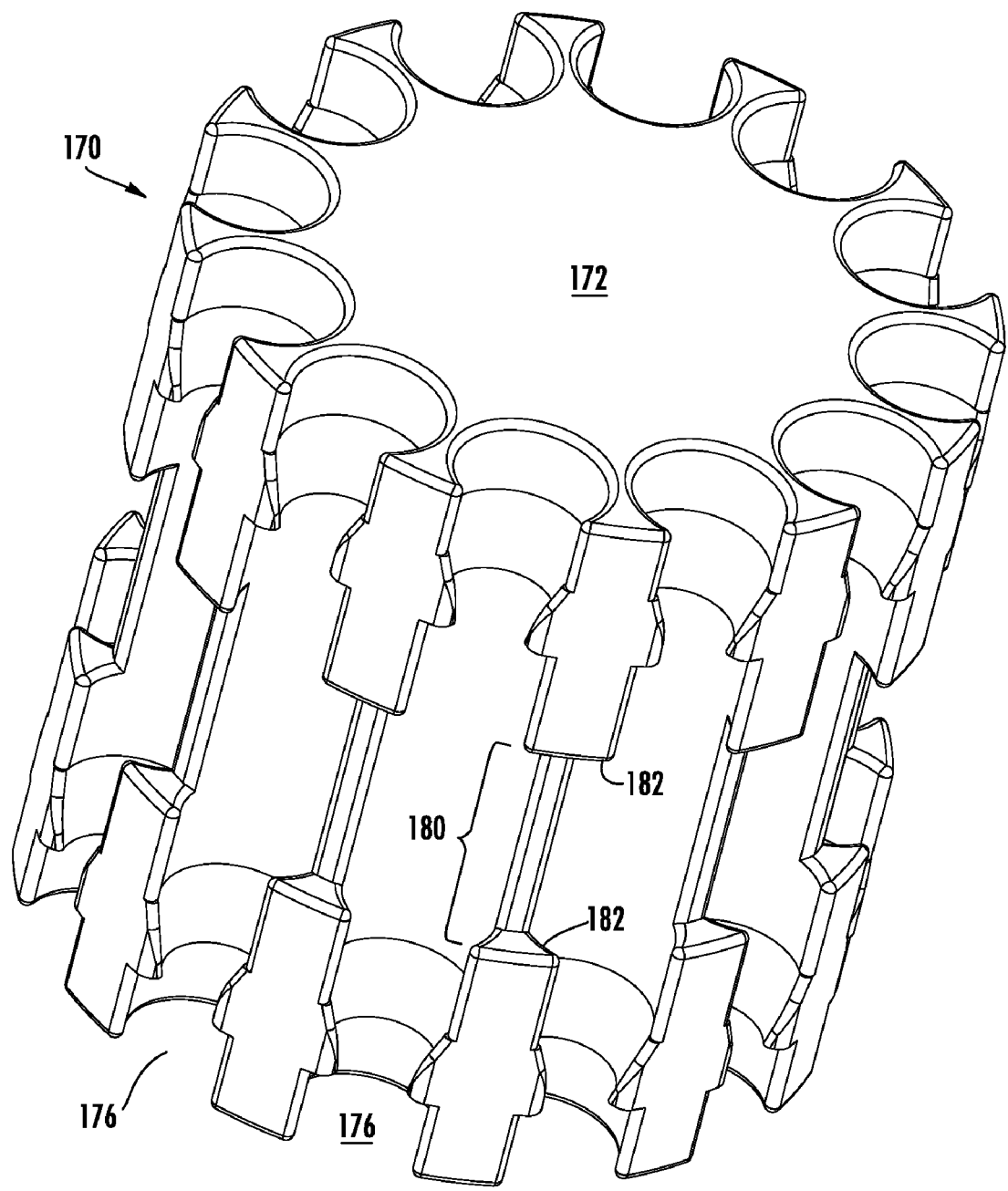
Figure 20:
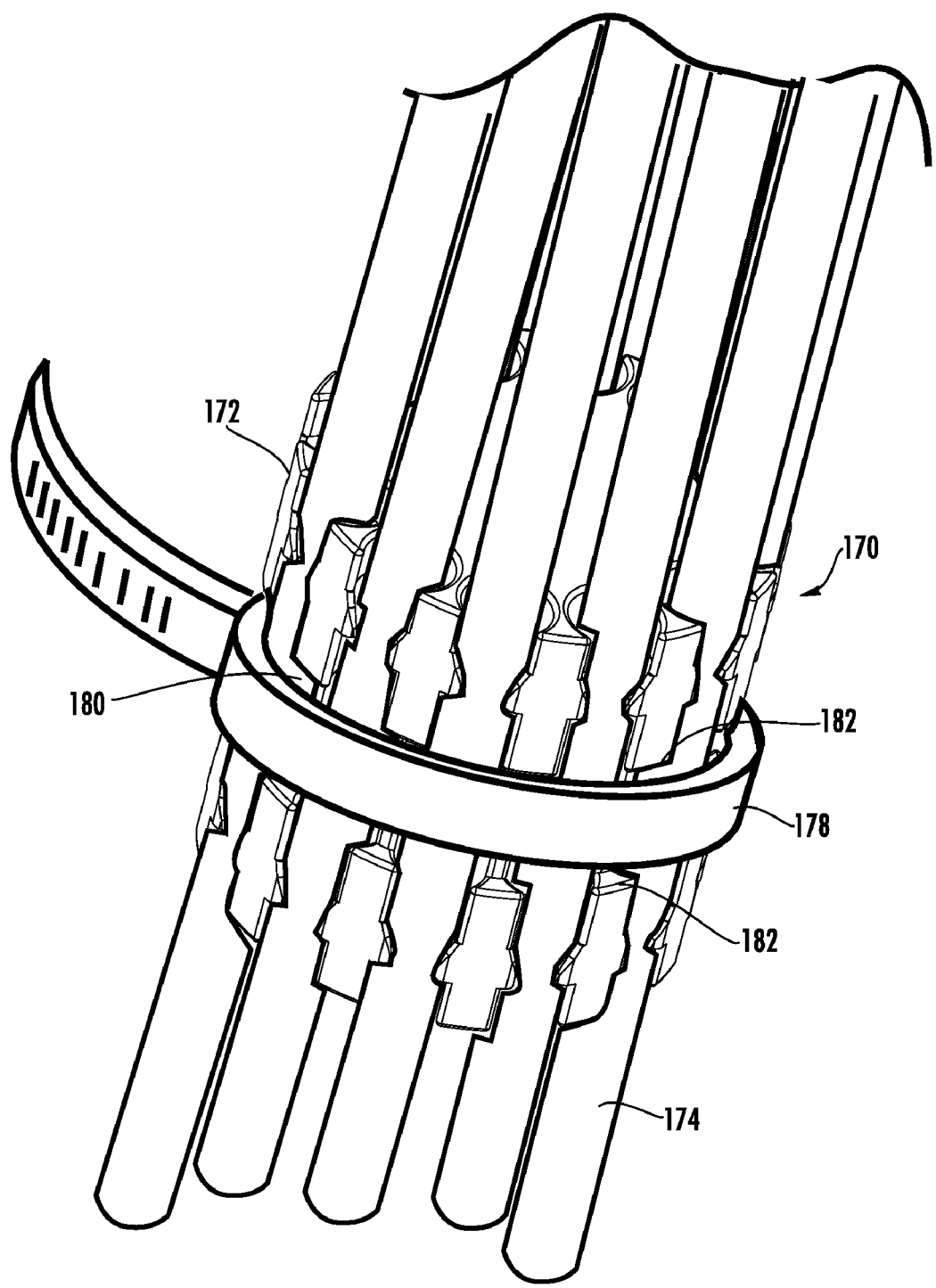
Figure 21:
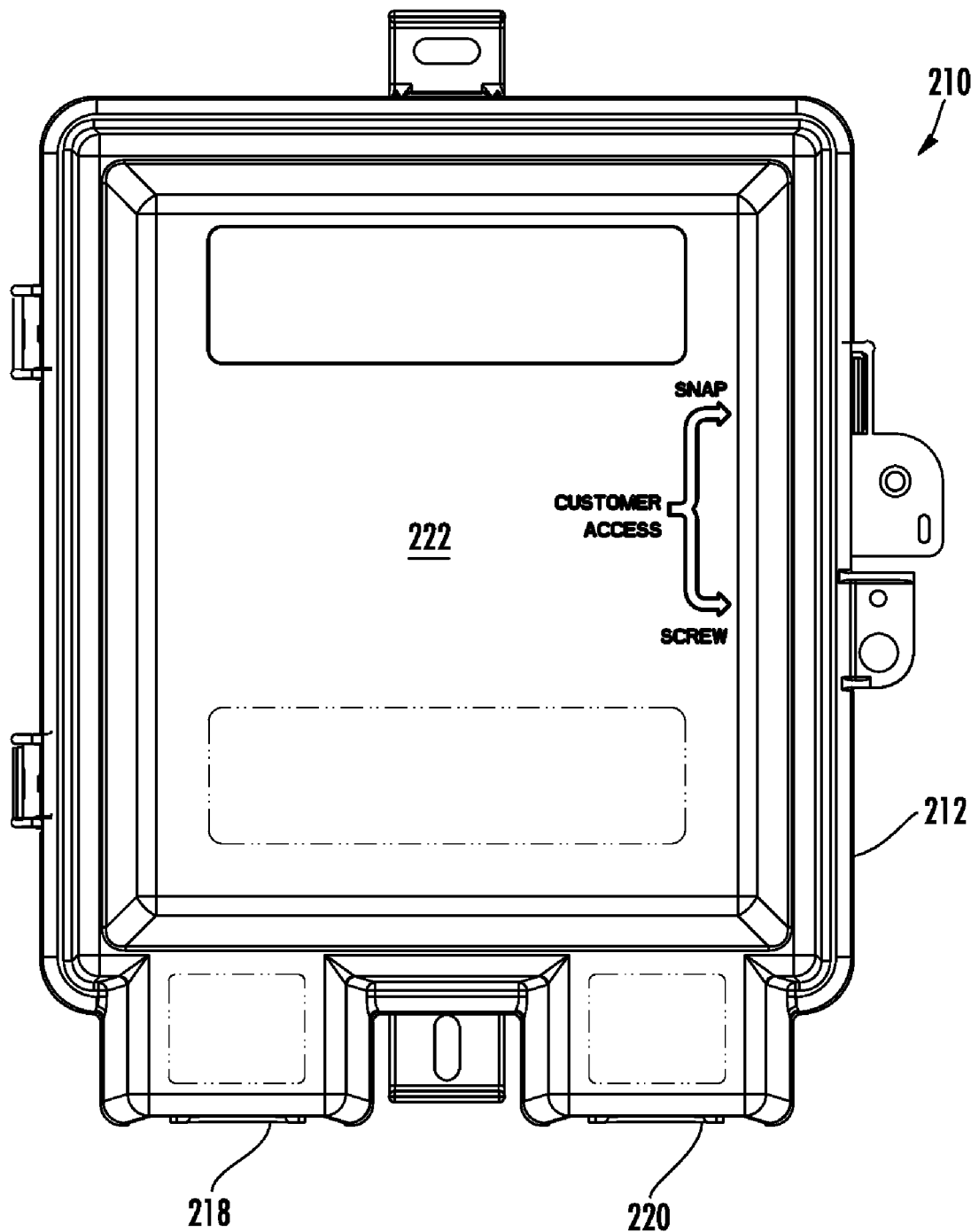
Figure 22:
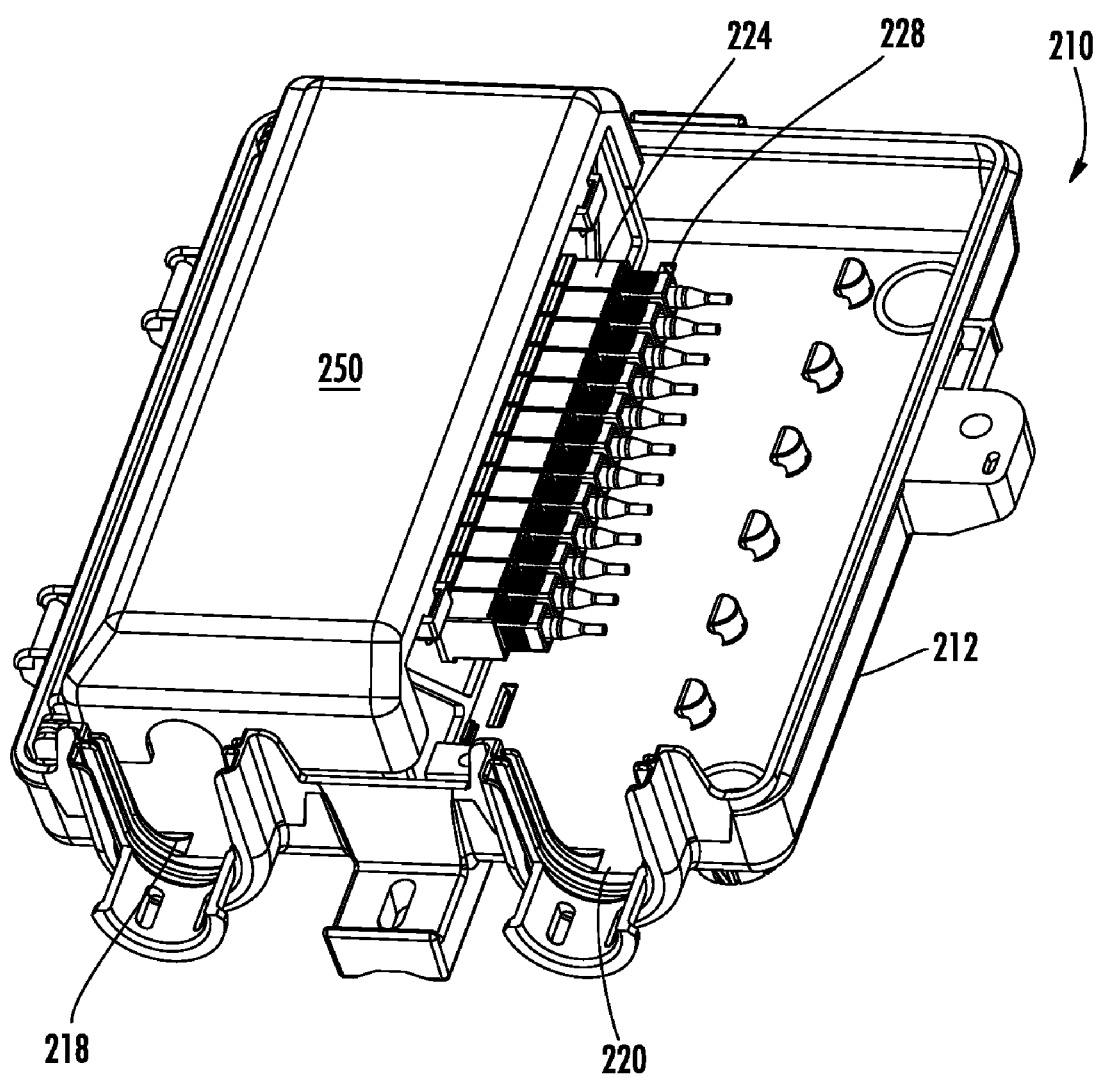
Figure 23:
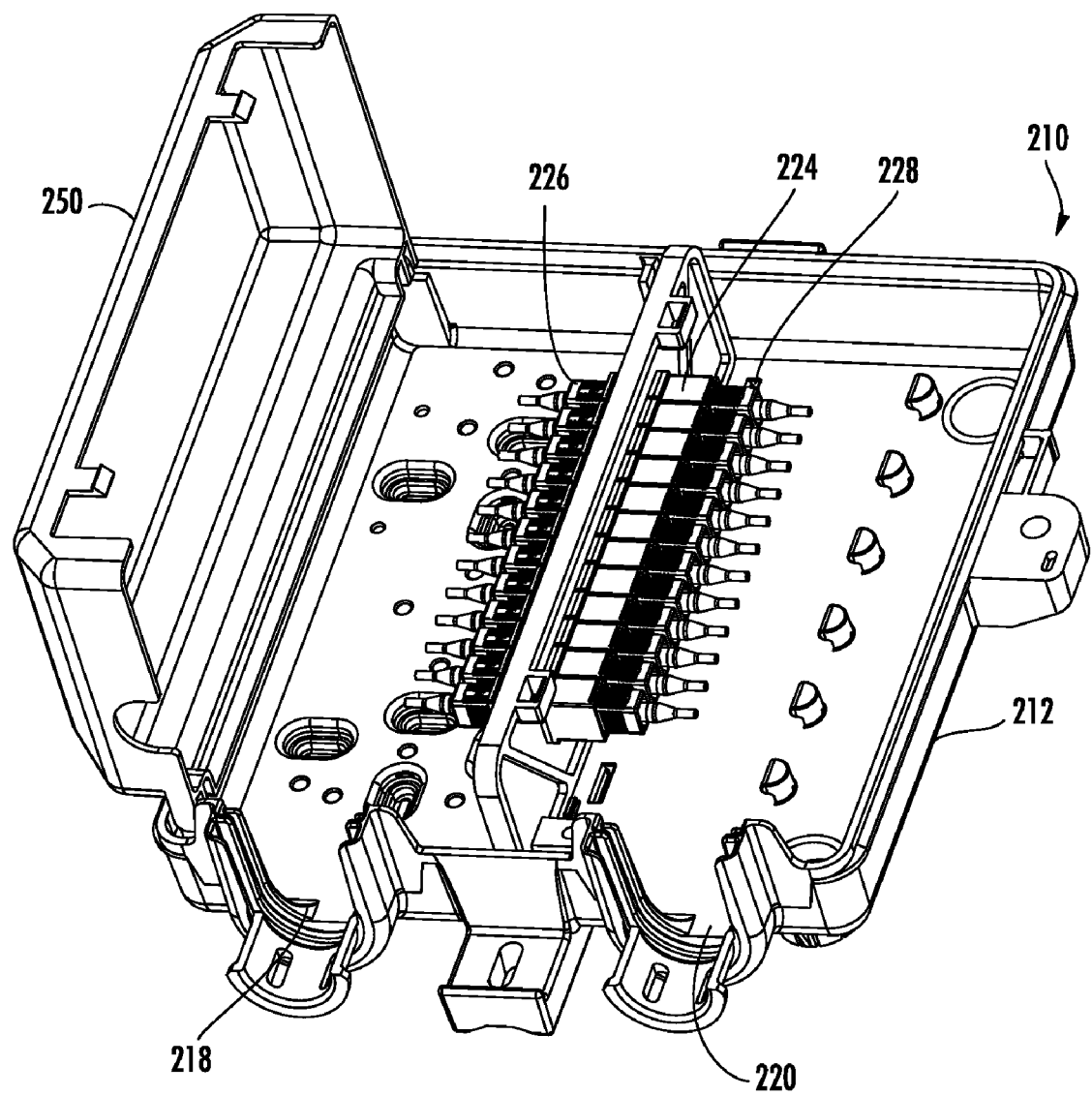
Figure 24:
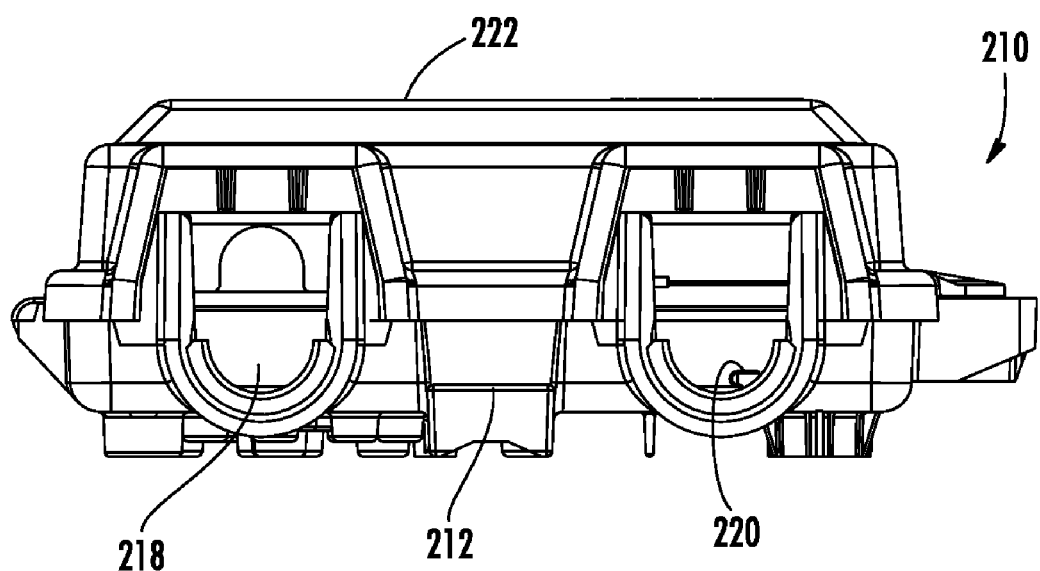
Figure 25:
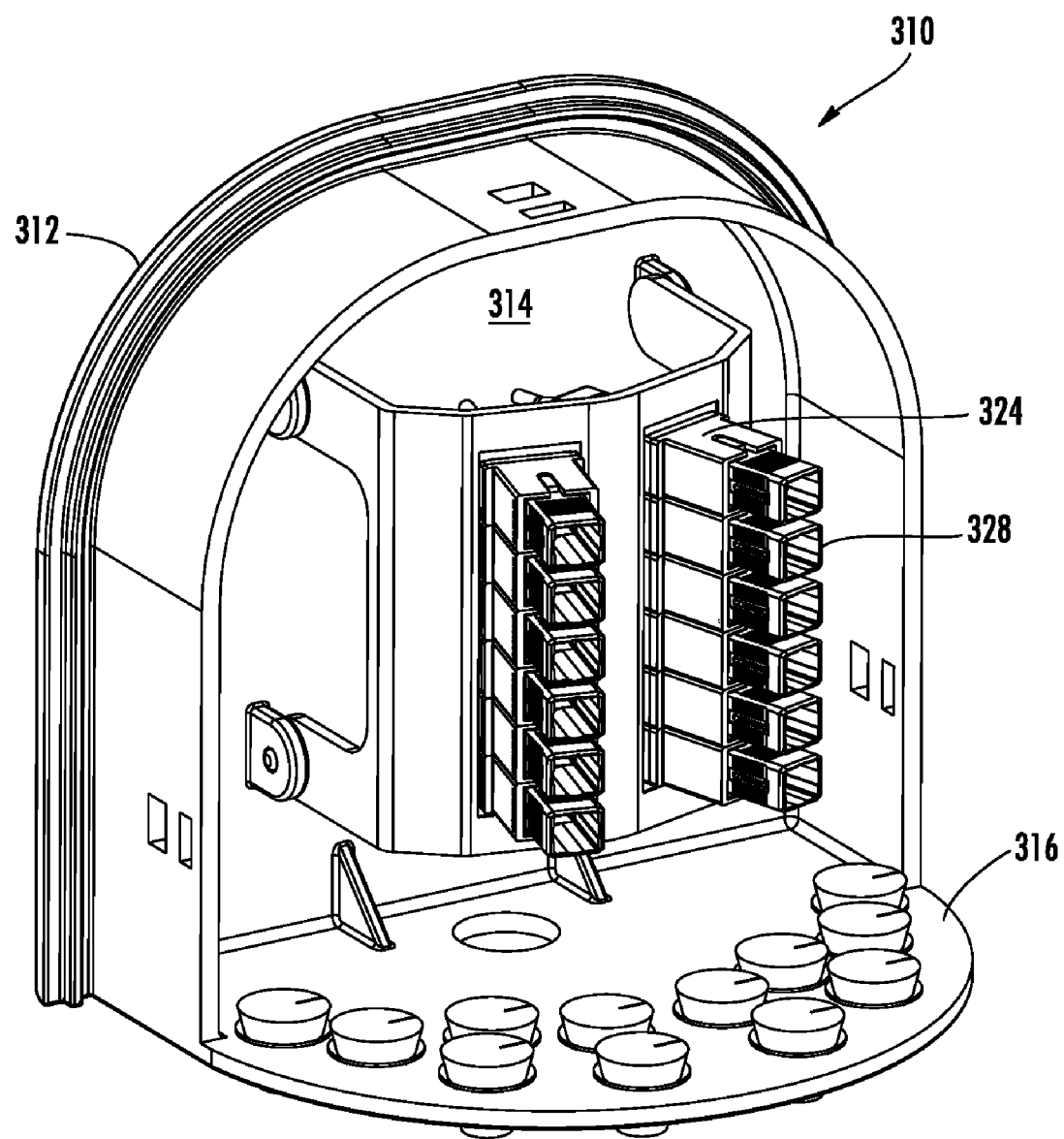
Figure 26:
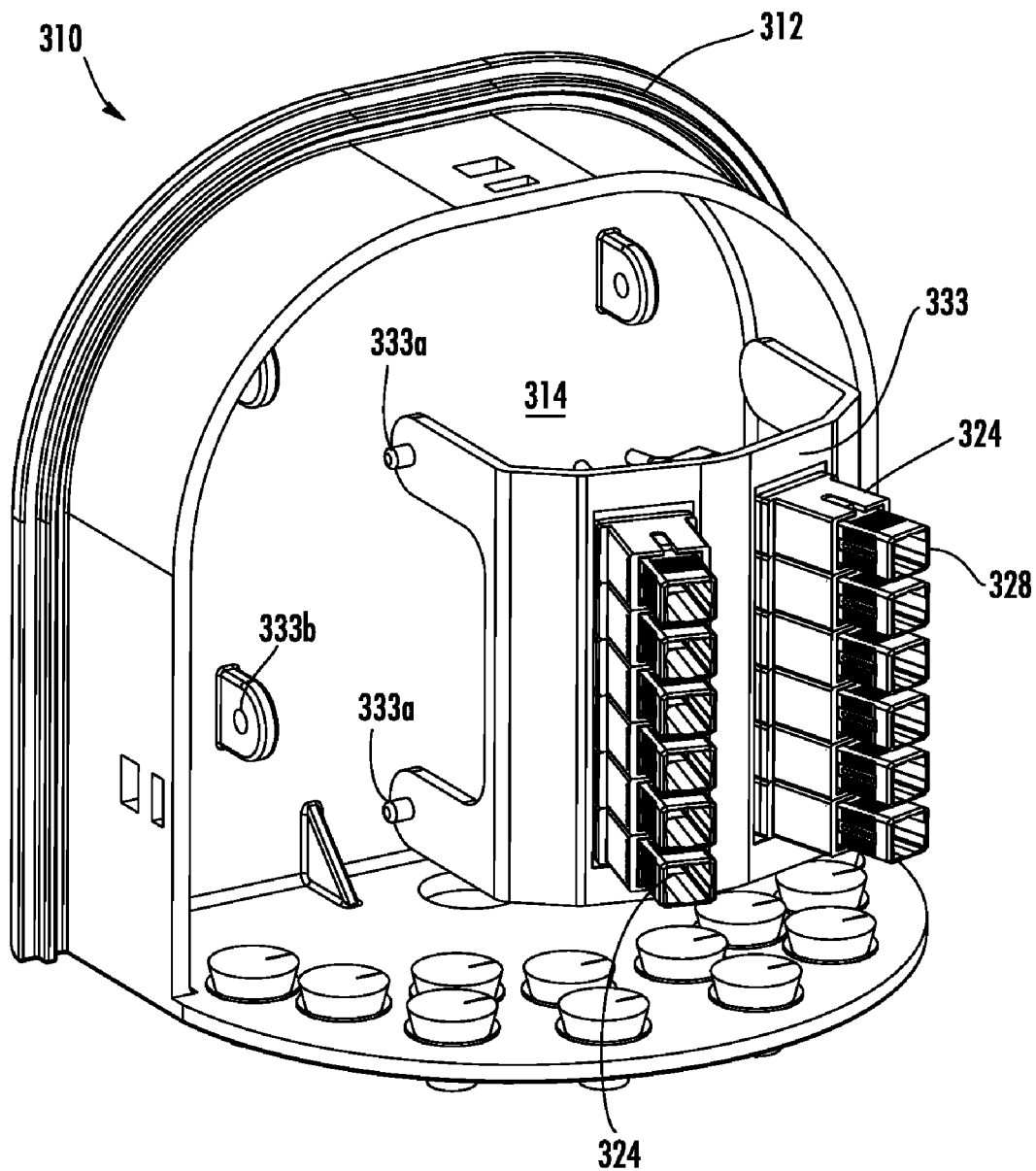
Figure 27:
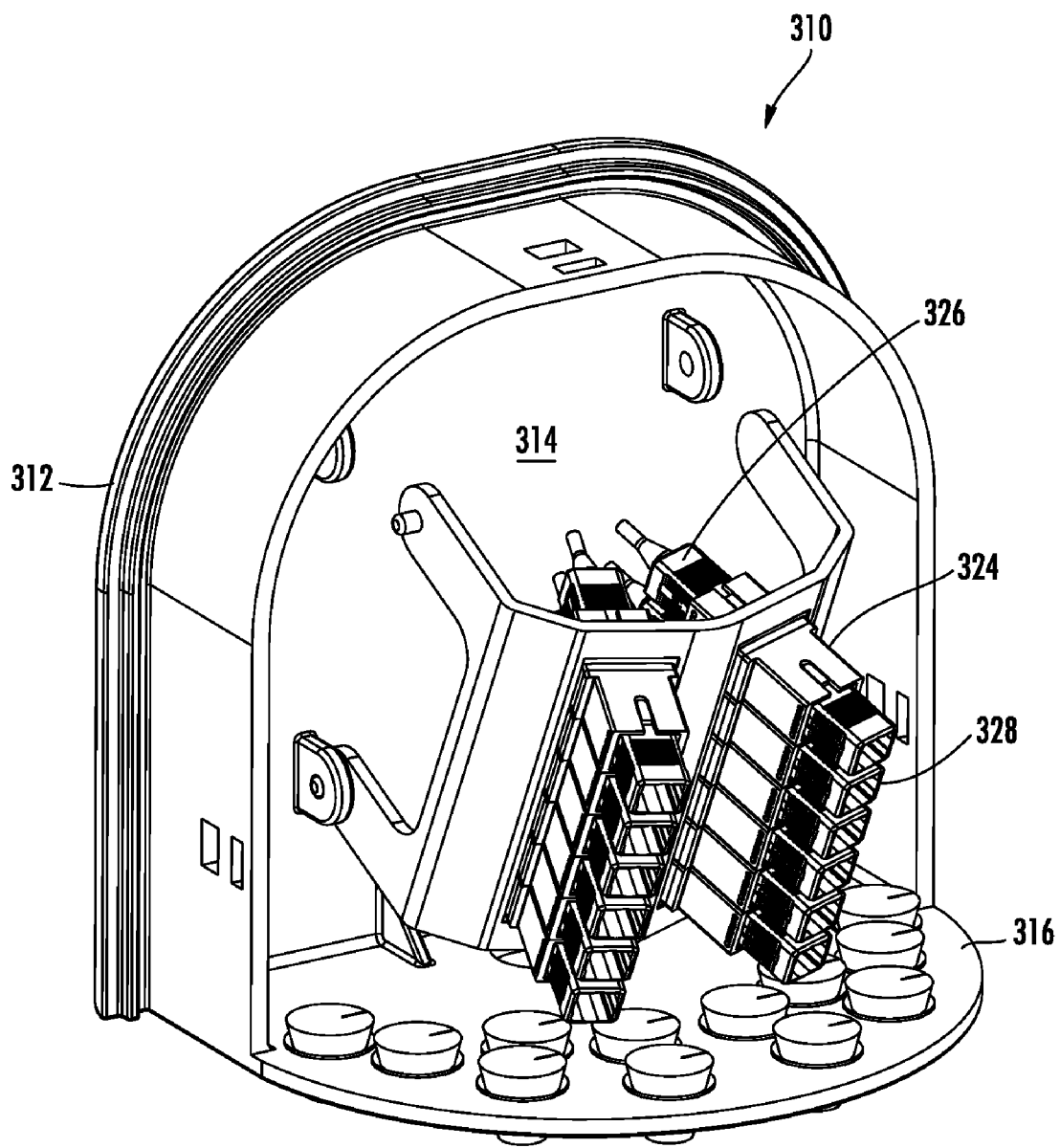
Figure 28:
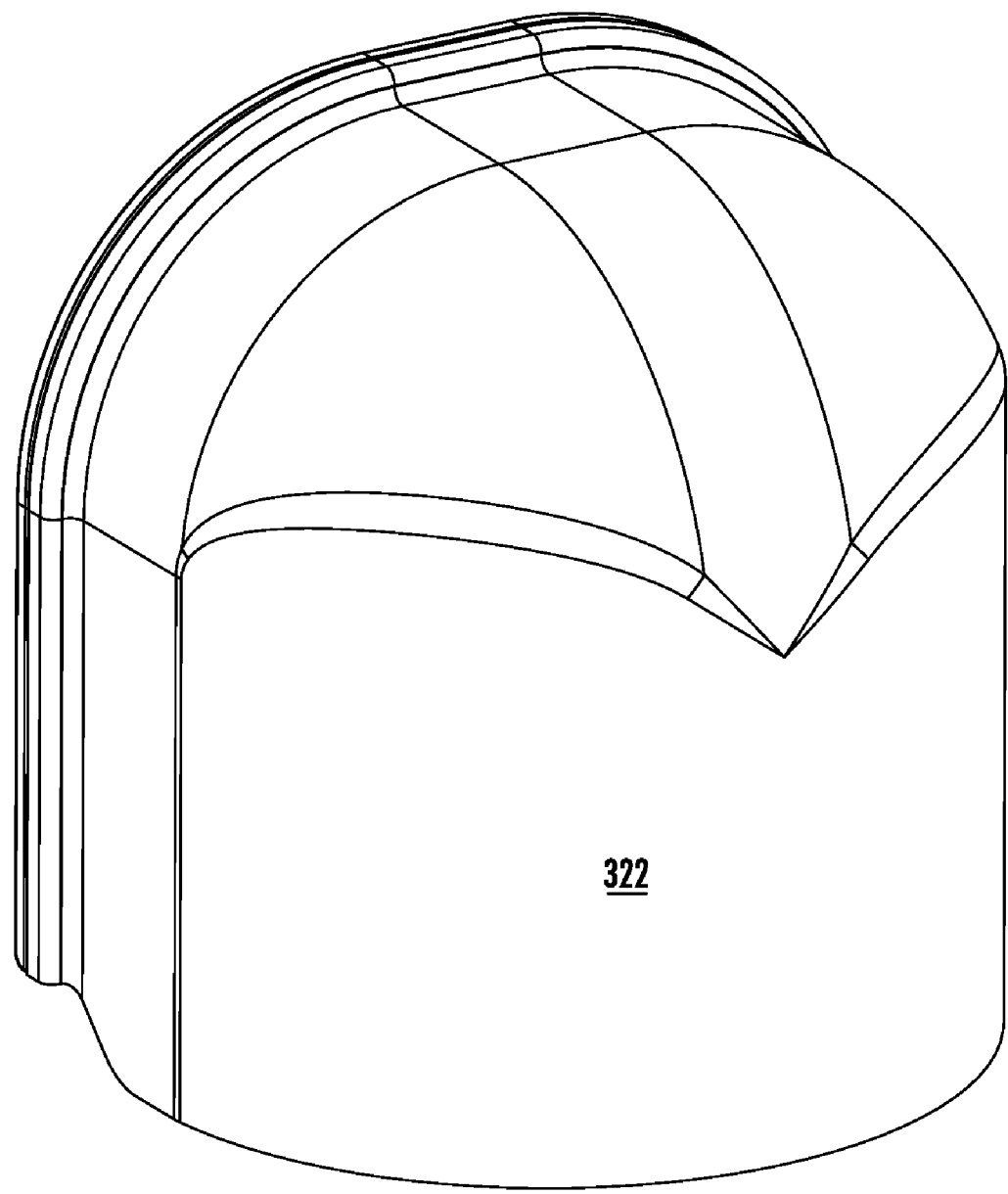
Figure 29:
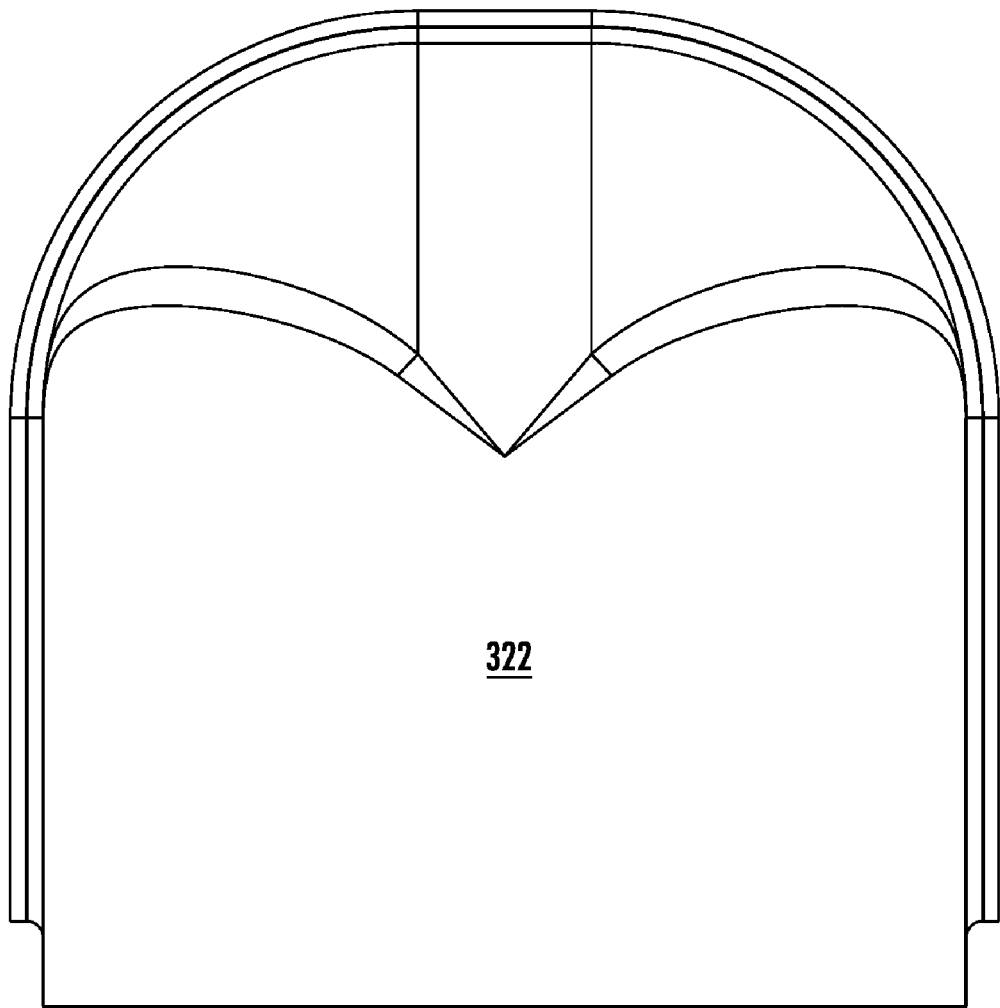
Figure 30:
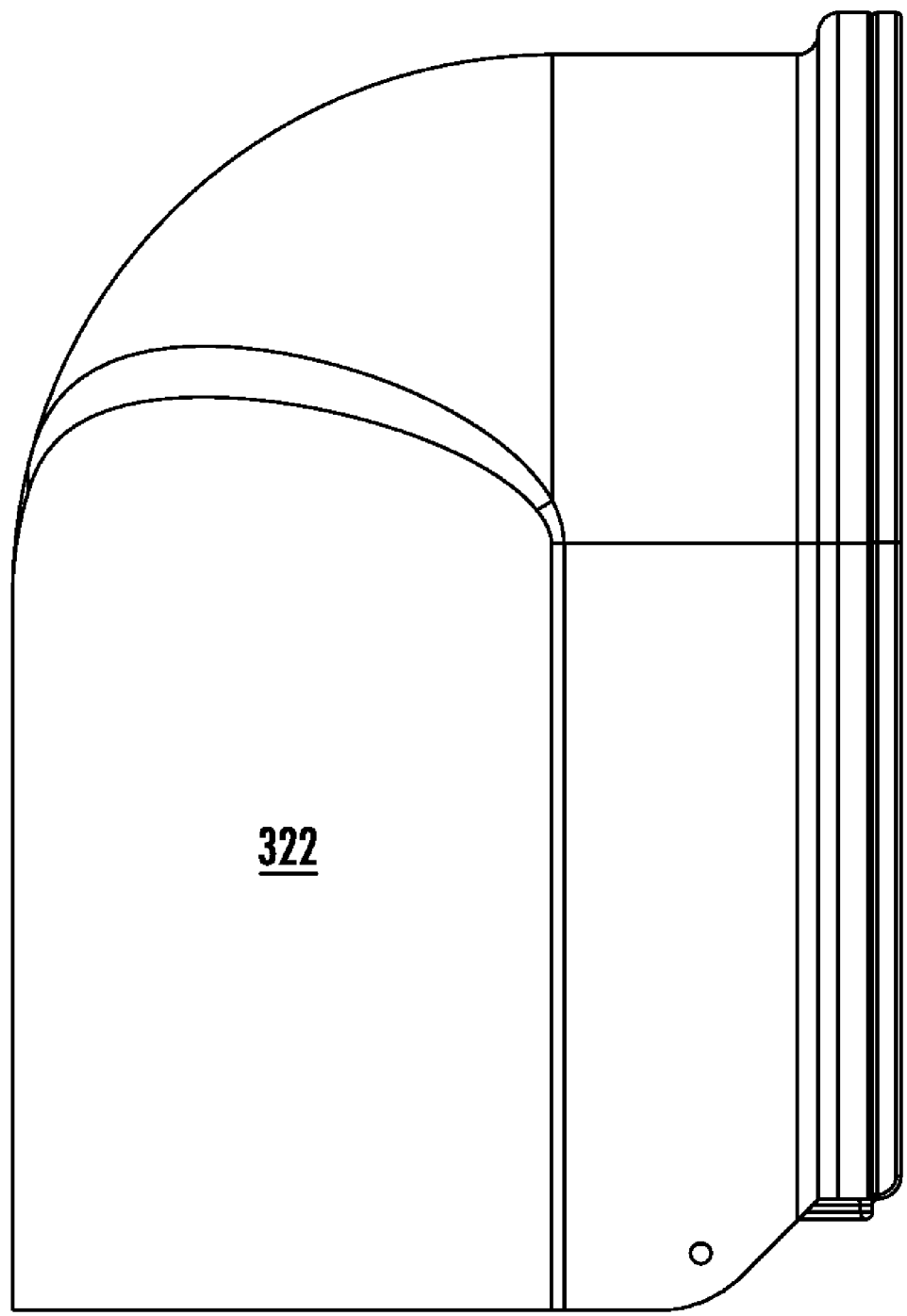
Figure 31:
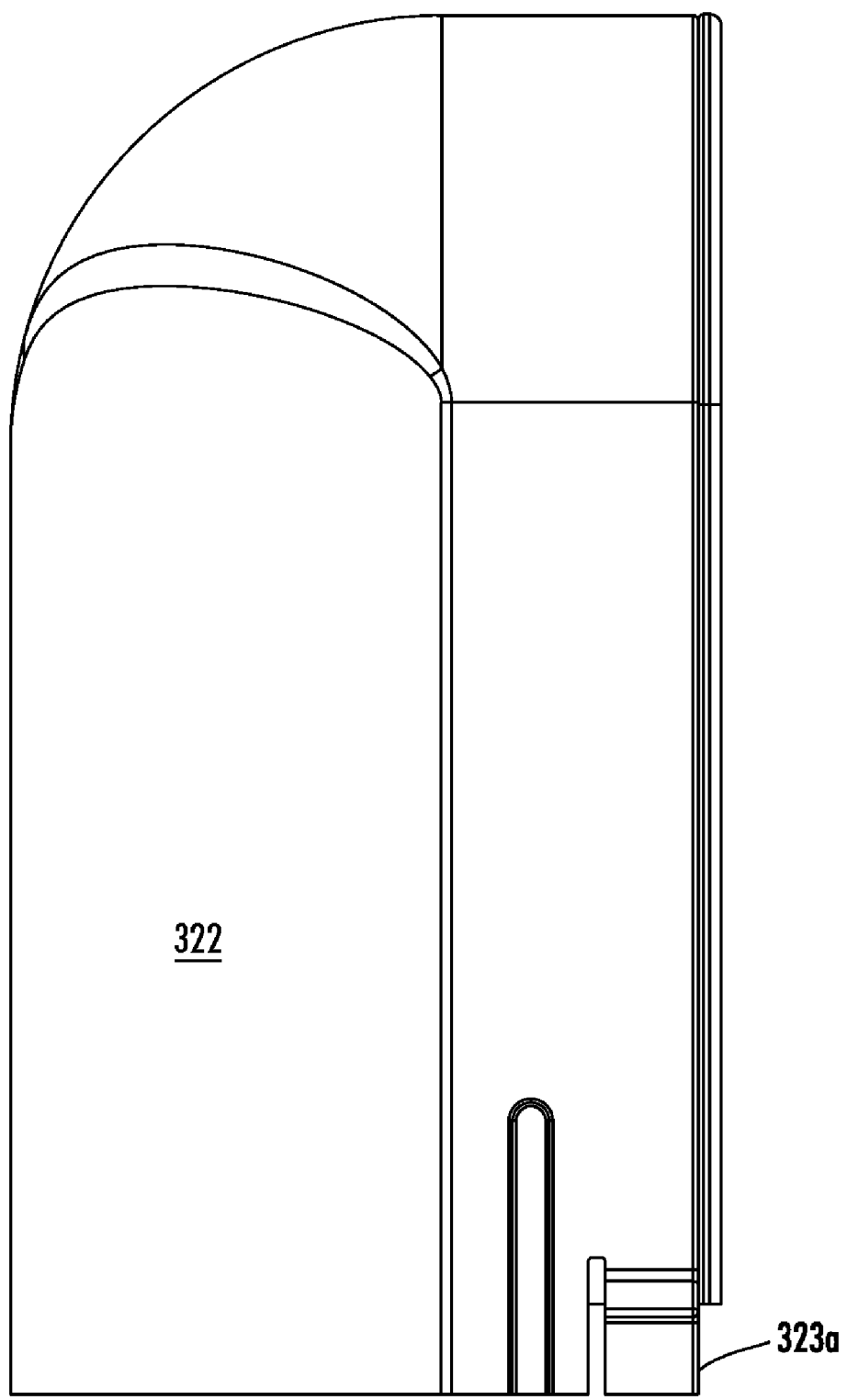
Figure 32:
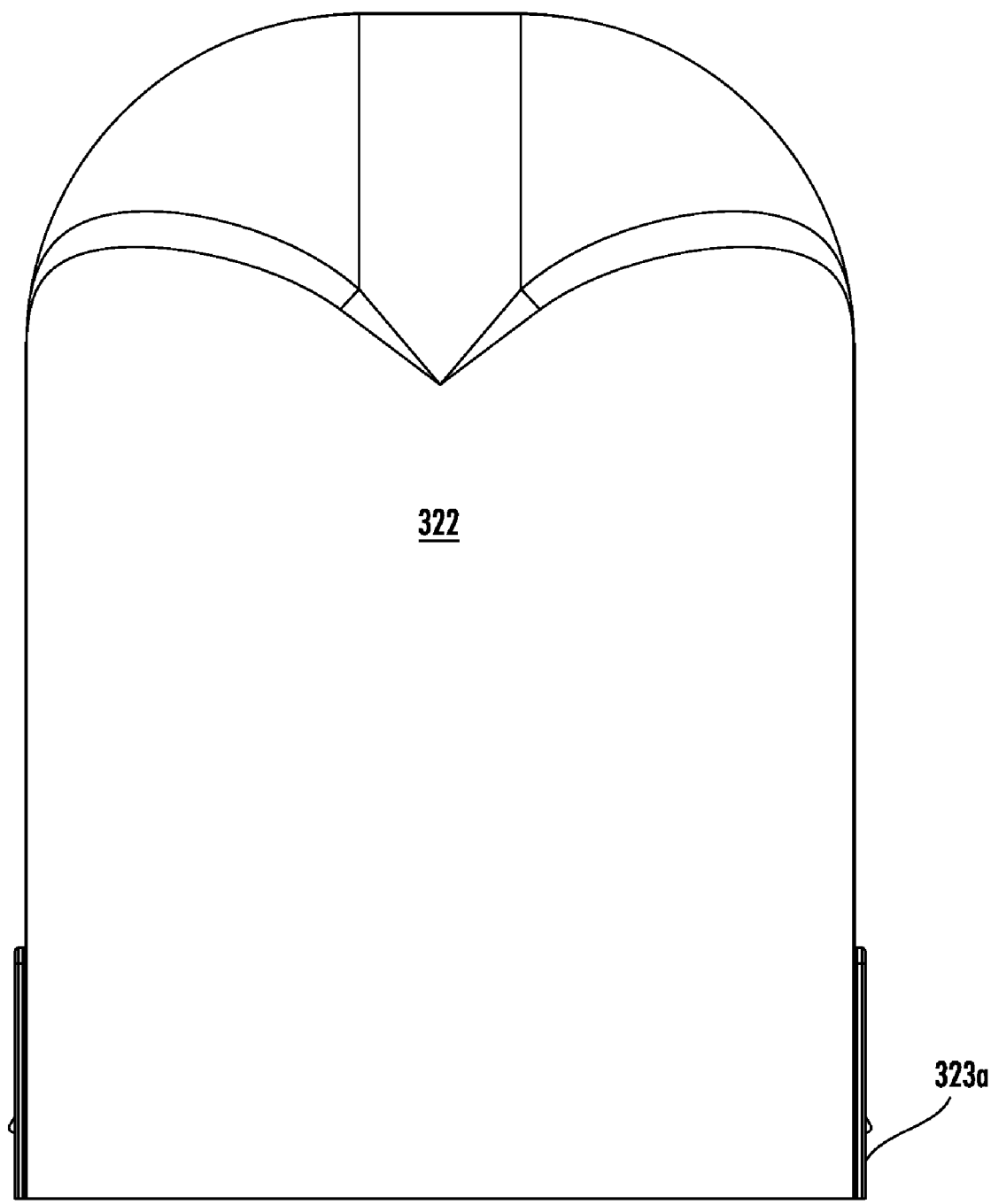
Figure 33:
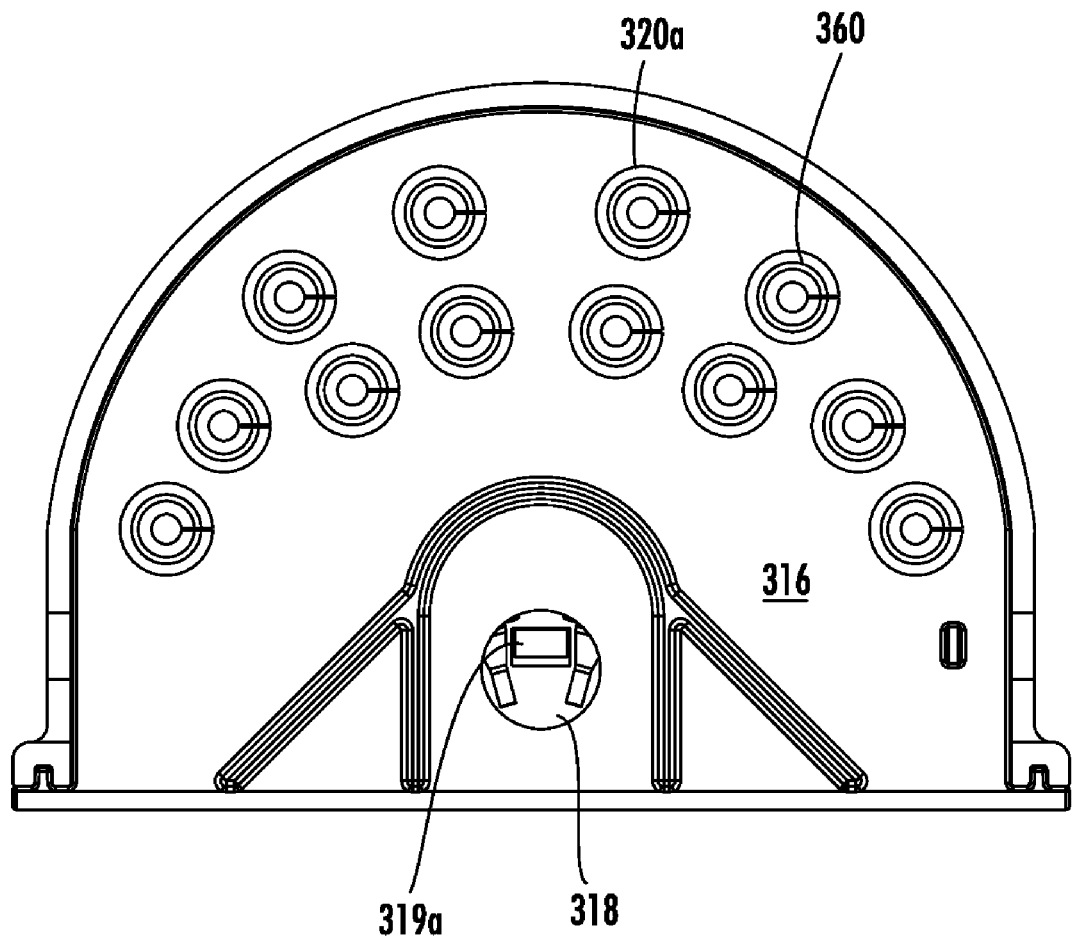
Figure 34:
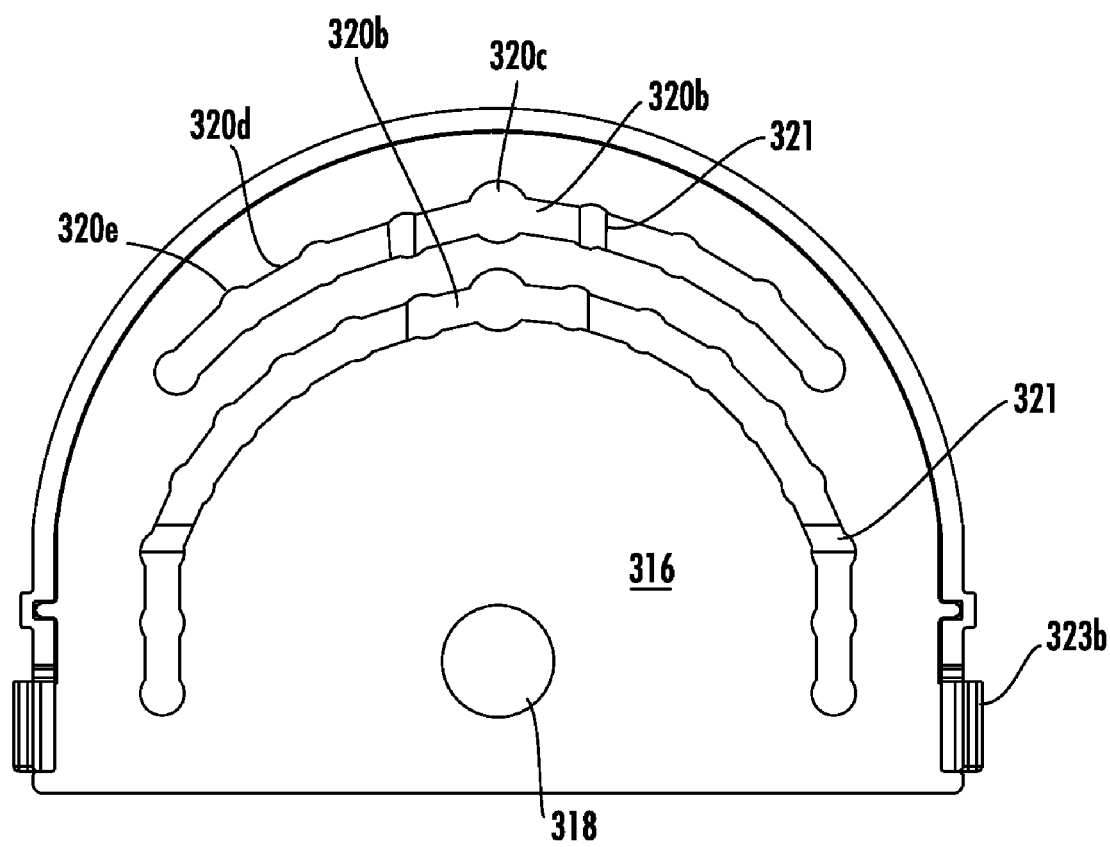
Figure 35:
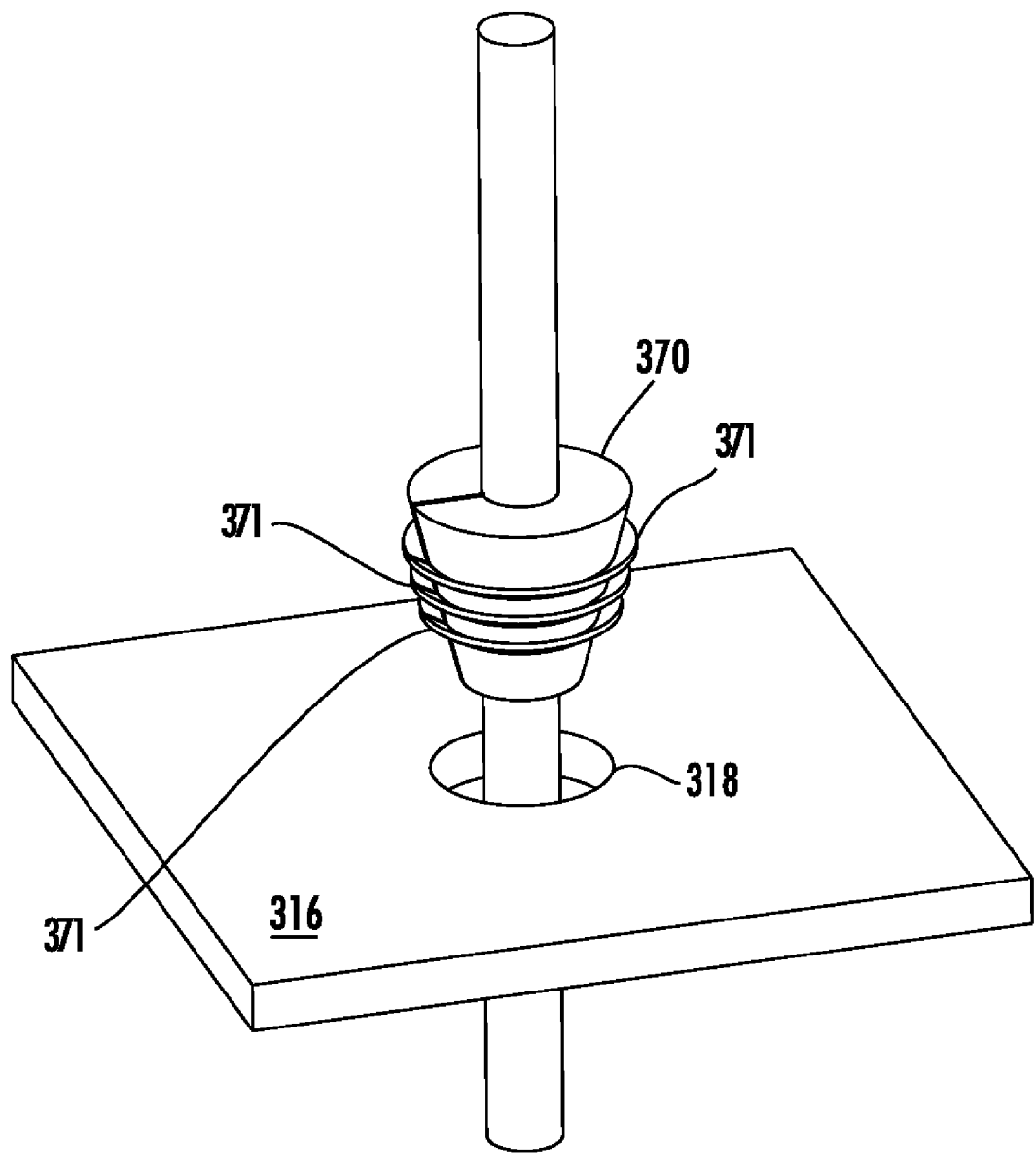
Figure 36:
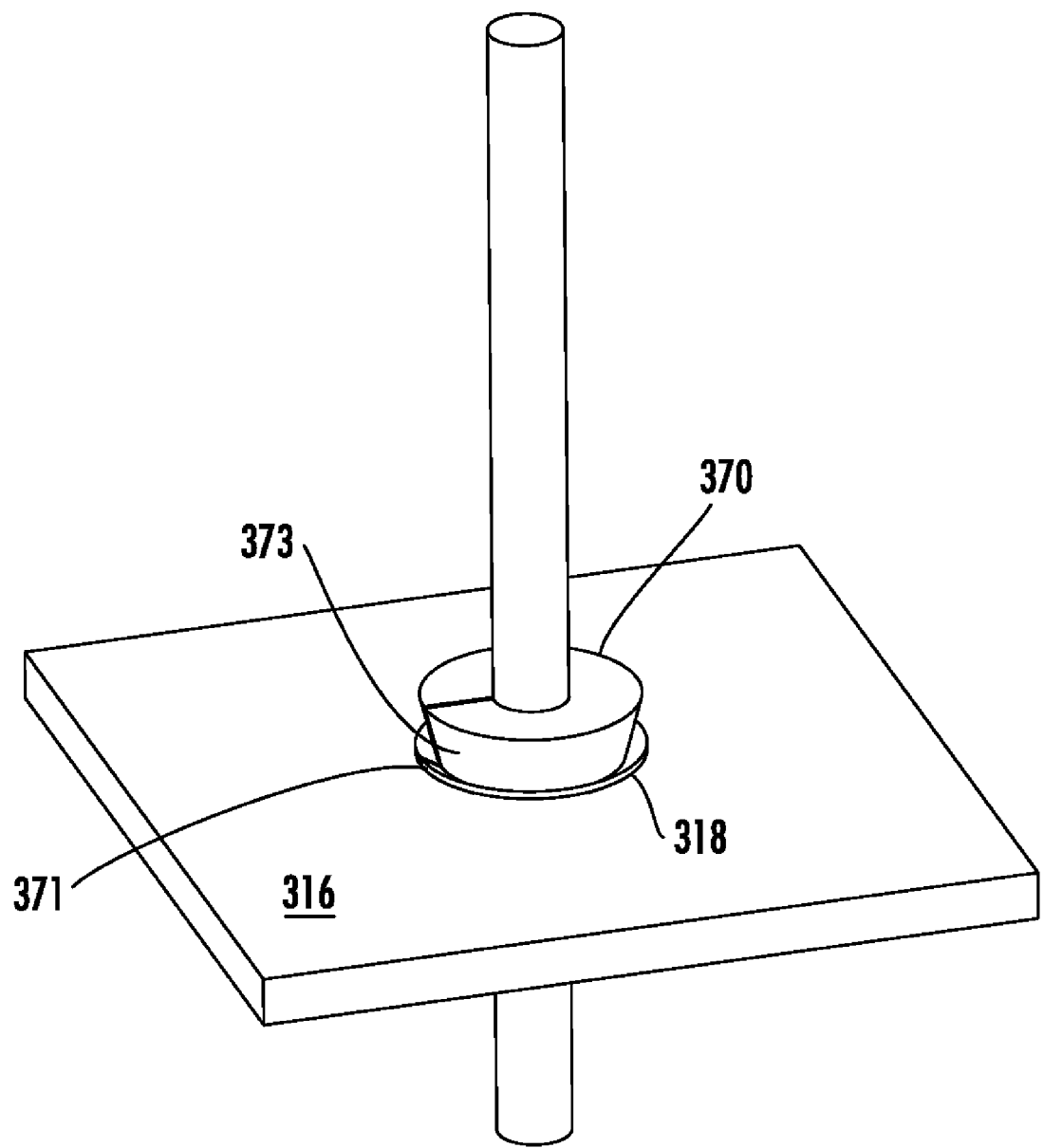
Figure 37:
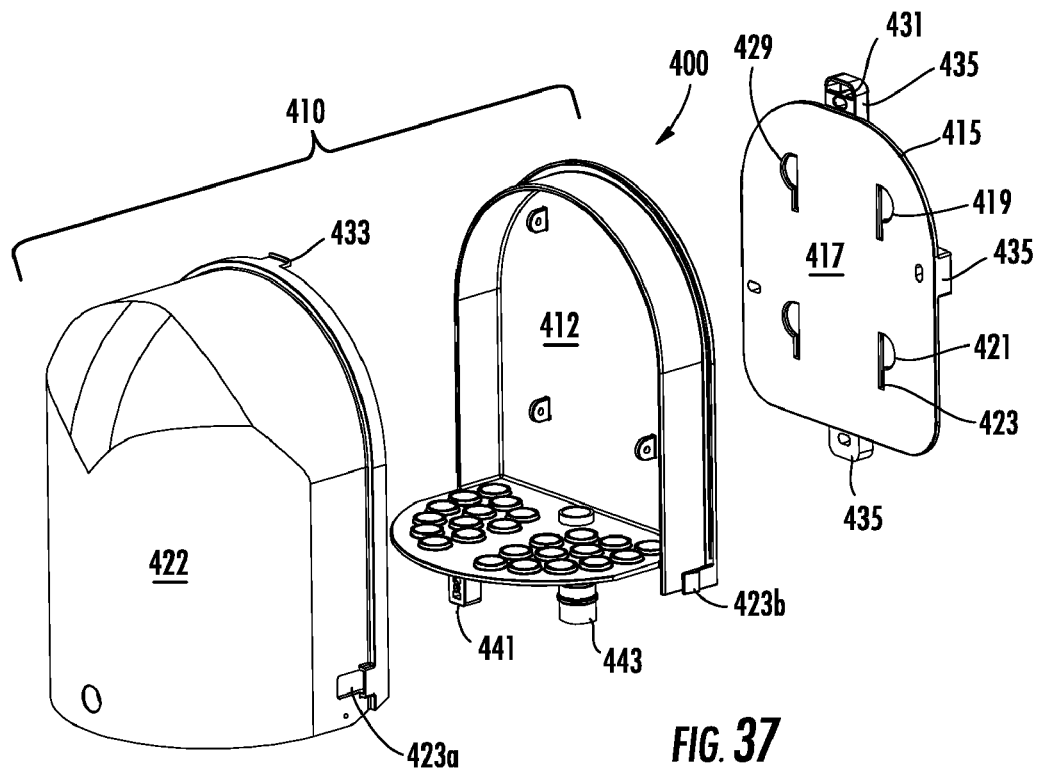
Figure 38:
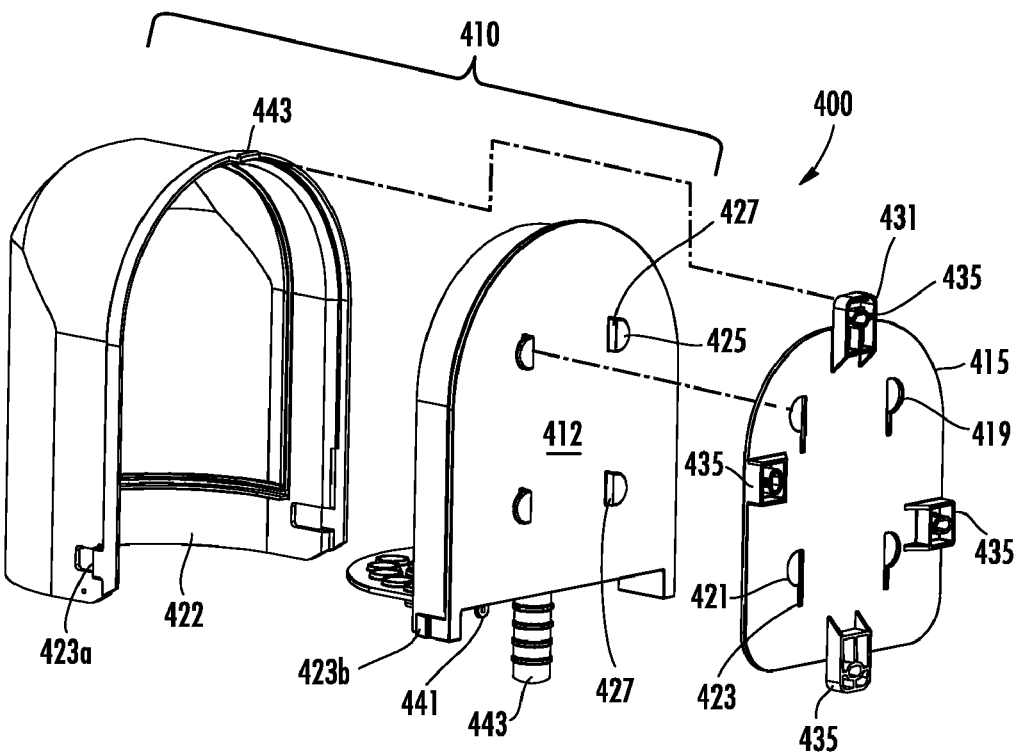
Figures 39, 40:
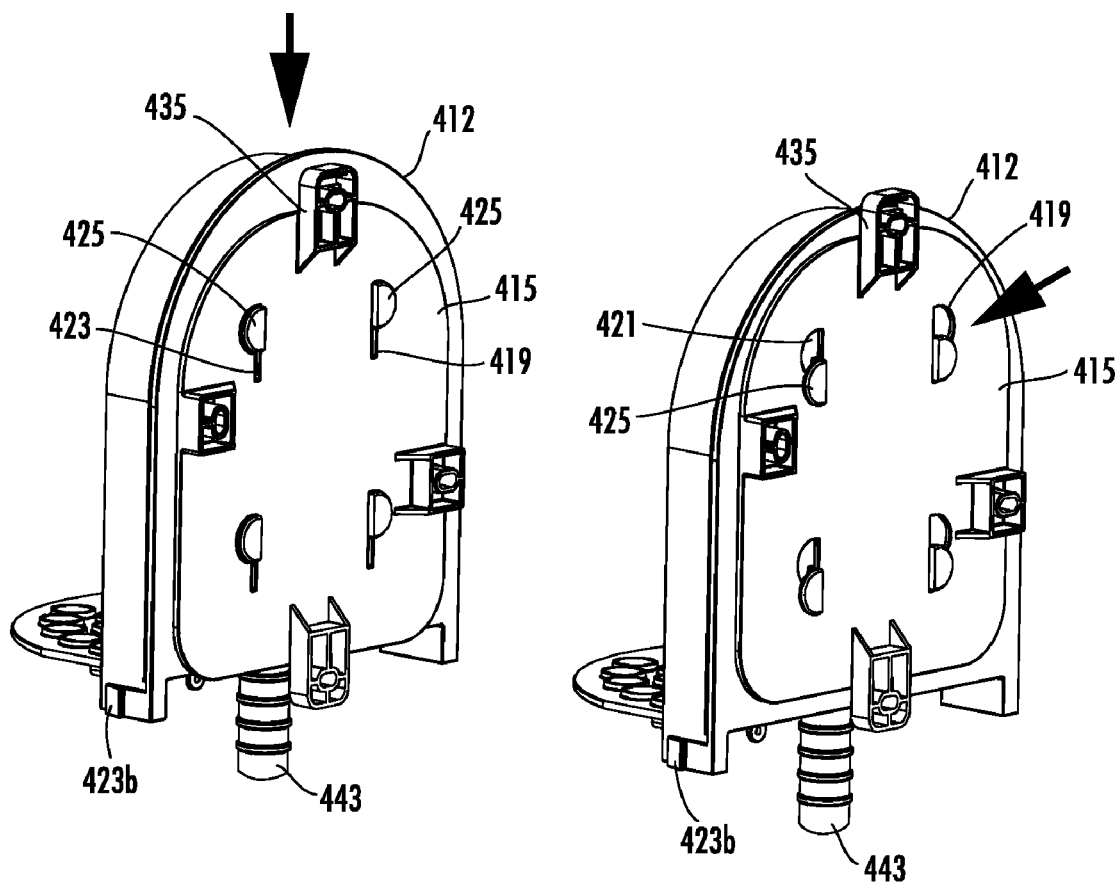
Figure 41:
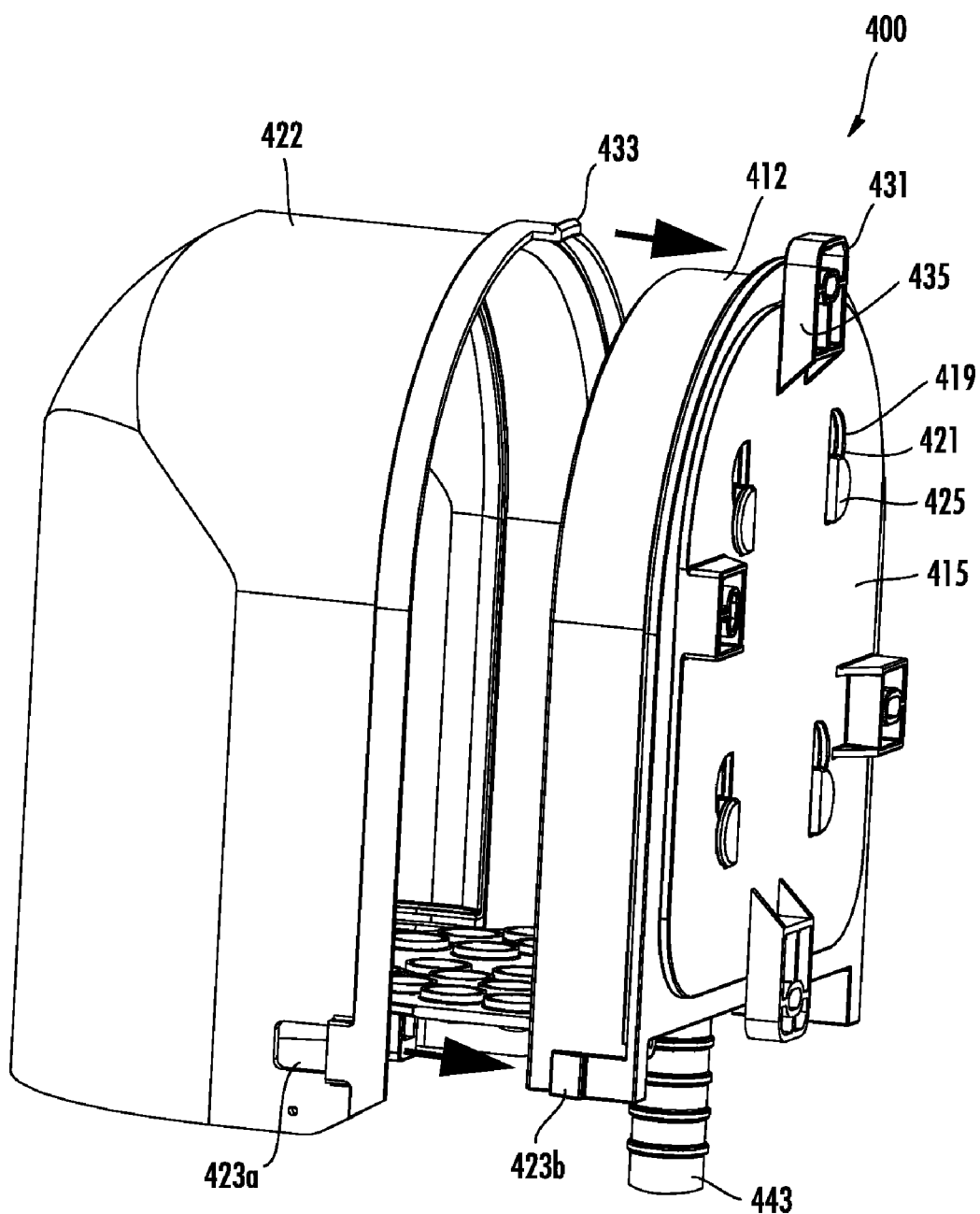
Figures 42, 43:
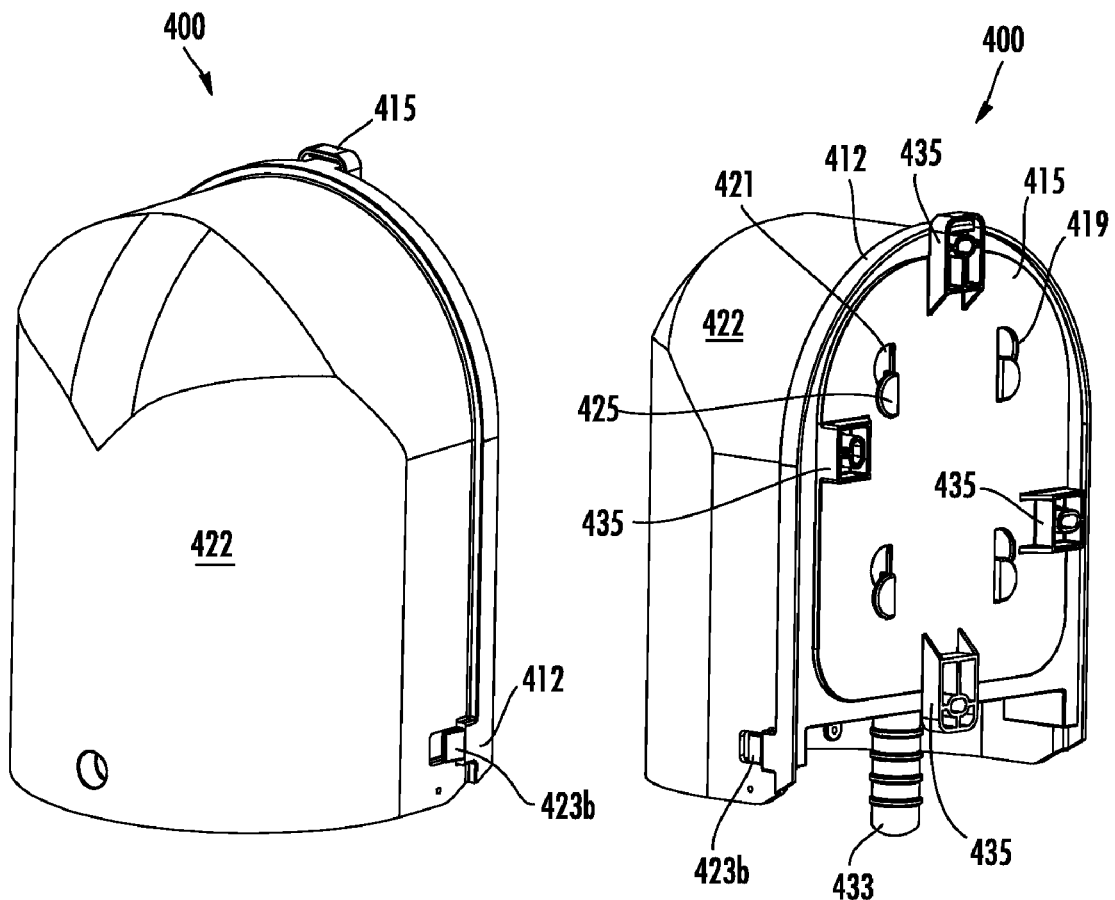
Figure 44:
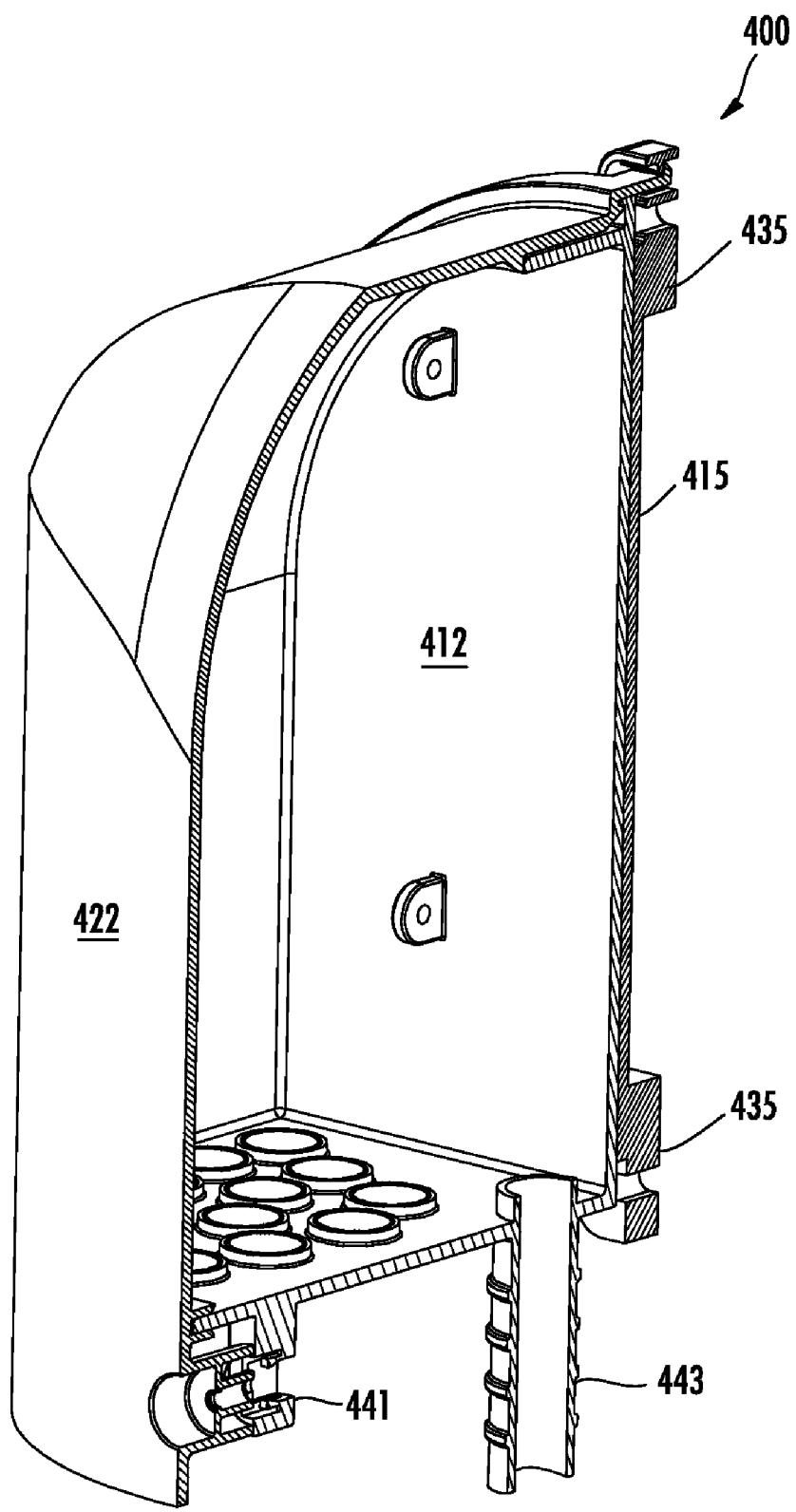
Figure 45:
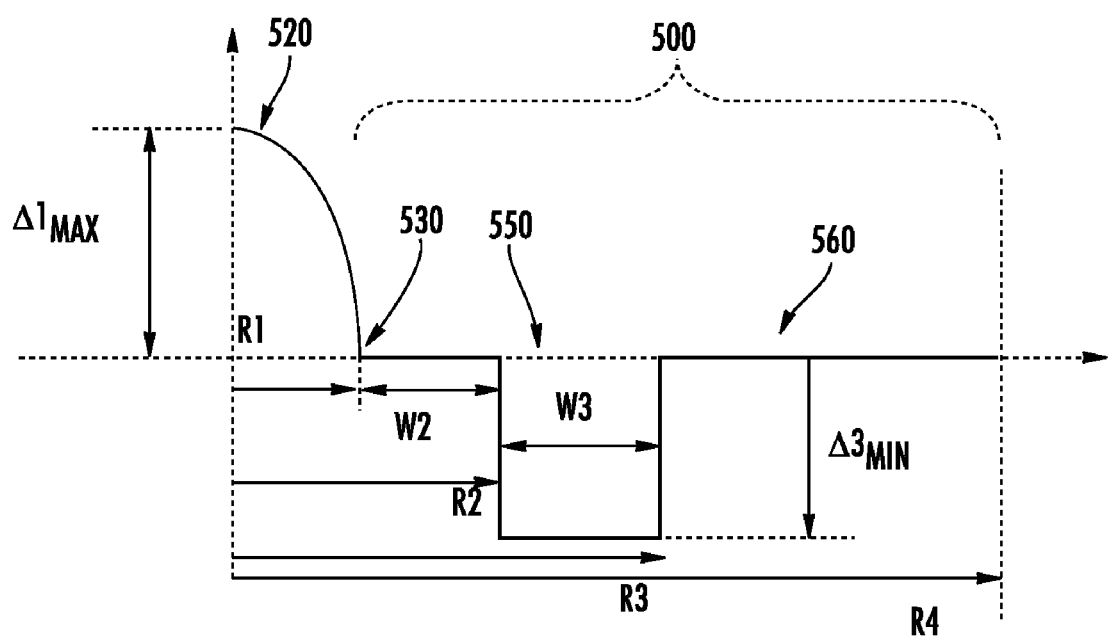

Having thus described the invention in general terms, reference will now be made to the accompanying drawings, which are not necessarily drawn to scale and are meant to be illustrative and not limiting, and wherein:

FIG. 1 is a perspective view of a fiber drop terminal ("FDT") in accordance with a first embodiment of the present invention, illustrating the cover selectively removed from the base;

FIG. 2 is a perspective view of the FDT of FIG. 1, illustrating four pluralities of adapters joined to the back wall of the base and a plurality of openings in the sidewall of the base for passage of four distribution cables and 48 drop cables;

FIG. 3 is a perspective view of the four pluralities of adapters of the FDT of FIG. 1, illustrating horizontal hinge at the lower end of vertical bars to which the pluralities of adapters are connected and illustrating the latch at the upper end of the vertical bars;

FIG. 4 is a perspective view of the four pluralities of adapters of the FDT of FIG. 1, illustrating a first plurality of adapters rotated downward generally about a horizontal axis;

FIG. 5 is a perspective view of the four pluralities of adapters of the FDT of FIG. 1, illustrating the second plurality of adapters rotated downward generally about a horizontal axis;

FIG. 6 is a perspective view of the four pluralities of adapters of the FDT of FIG. 1, illustrating the third plurality of adapters rotated downward generally about a horizontal axis;

FIG. 7 is an enlarged perspective view of the fourth plurality of adapters of the FDT of FIG. 1, illustrating a bracket at the upper end of the vertical bar, wherein the bracket defines a slot adapted to enable selective rotation of the plurality of adapters about a generally vertical axis;

FIG. 8 is an enlarged perspective view of the fourth plurality of adapters of the FDT of FIG. 1, illustrating the vertical bar repositioned relative to the bracket as compared to the view of FIG. 7;

FIG. 9 is an enlarged perspective view of the fourth plurality of adapters of the FDT of FIG. 1, illustrating the vertical bar rotated about a generally vertical axis relative to the view of FIG. 8;

FIG. 10 is schematic view of the bottom of the four pluralities of adapters of the FDT of FIG. 1, illustrating the horizontal hinge of the three pluralities of adapters and the bracket of the fourth plurality of adapters;

FIG. 11 is a perspective view of the FDT of FIG. 1, illustrating the cover selectively attached to the base;

FIG. 12 is a perspective view of an FDT in accordance with a second embodiment of the present invention, illustrating two pluralities of adapters and two splice trays mounted to the base, wherein the splice trays enable splicing of the drop cables to connectorized pigtails;

FIG. 13 is a perspective view of the FDT of FIG. 12, illustrating a first plurality of adapters rotated downward generally about a horizontal axis, wherein the latch comprises a fastener for positioning through an opening in the vertical bar of the plurality of adapters;

FIG. 14 is a perspective view of the FDT of FIG. 12, illustrating a second plurality of adapters rotated downward generally about a horizontal axis;

FIG. 15 is a perspective view of the FDT of FIG. 12, illustrating the selective removal of one splice tray from the base of the FDT;

FIG. 16 is an enlarged perspective view of grommets used in the FDTs of both of the embodiments of FIGS. 1 and 12, illustrating a first grommet adapted to receive 12 drop cables and a second grommet (on the right) adapted to receive 24 drop cables;

FIG. 17 is a perspective view of a strain relief device adapted for use with microstructured optical fiber in accordance with one embodiment of the present invention, illustrating the strain relief device within the FDT of FIG. 1 proximate the grommet of FIG. 16;

FIG. 18 is an enlarged perspective view of the strain relief device of FIG. 17, illustrating the plurality of slots adapted to receive the microstructured optical fibers;

FIG. 19 is an enlarged perspective view of the strain relief device of FIG. 17, illustrating a circumferential slot with at least one shoulder adapted to receive and prevent axial movement of a compression device;

FIG. 20 is an enlarged perspective view of the strain relief device of FIG. 17, illustrating the compression device, comprising a wire tie device, provided within the circumferential slot to provide strain relief to the microstructured optical fibers;

FIG. 21 is a front schematic view of an FDT in accordance with a third embodiment of the present invention, illustrating the cover;

FIG. 22 is a perspective view of the FDT of FIG. 21, illustrating the plurality of adapters and the distribution cover provided between the back wall and the cover to provide limited access to the portion of the adapters that are adapted to receive a connector of the distribution cable;

FIG. 23 is a perspective view of the FDT of FIG. 21, illustrating the distribution cover in an opened position, thus allowing access to the portion of the adapters that are adapted to receive a connector of the distribution cable;

FIG. 24 is a bottom schematic view of the FDT of FIG. 21, illustrating the opening in the base for passage of the distribution cable (on the left) and the opening in the base for passage of the drop cables (on the right);

FIG. 25 is a perspective view of an FDT in accordance with a fourth embodiment of the present invention, illustrating two pluralities of adapters joined to a bracket that is selectively removable from the base;

FIG. 26 is a perspective view of the FDT of FIG. 25, illustrating the removal of the bracket from the base of the FDT;

FIG. 27 is a perspective view of the FDT of FIG. 25, illustrating the selective rotation of the bracket relative to the base of the FDT;

FIG. 28 is a perspective view of a cover adapted to be selectively connected to the base of the FDT of FIG. 25, illustrating the generally dome shape of the cover;

FIG. 29 is a front schematic view of the cover of FIG. 28;

FIG. 30 is a side schematic view of the cover of FIG. 28;

FIG. 31 is a side schematic view of an alternative cover adapted to be selectively connected to the base of an FDT similar to the embodiment of FIG. 25, illustrating a protruding tab adapted to be received within a mating slot in the base of the FDT to selectively retain the cover relative to the base;

FIG. 32 is a front schematic view of the cover of FIG. 31;

FIG. 33 is a top schematic view of the sidewall of the base of an FDT similar to the embodiment of FIG. 25, illustrating one opening for passage of the distribution cable and plurality of openings for passage of the drop cables;

FIG. 34 is a top schematic view of the sidewall of the base of an FDT similar to the embodiment of FIG. 25, illustrating one opening for passage of the distribution cable and two slots adapted to allow passage of two or more drop cables, wherein each slot defines at least one opened portion sized to allow passage of a connector of a drop cable and each slot further defines other portions sized to allow passage of the drop cable alone;

FIG. 35 is a perspective view of a strain relief device adapted for use with an opening in an FDT, such as the opening for passage of the distribution cable in the FDT of FIG. 25, illustrating the generally frustoconical shape and the three ribs along the frustoconical surface to provide improved strain relief for the distribution cable;

FIG. 36 is a perspective view of the strain relief device of FIG. 35, illustrating the strain relief device selectively received within the opening of the FDT to seal and strain relieve the distribution cable;

FIG. 37 is a perspective view of an FDT assembly in accordance with yet another embodiment of the present invention, illustrating the disassembled mounting plate, base, and cover of the FDT assembly;

FIG. 38 is an alternative perspective view of the FDT assembly of FIG. 37, illustrating the disassembled mounting plate, base, and cover of the FDT assembly;

FIG. 39 is a rear perspective view of the mounting plate and base of the FDT assembly of FIG. 37, illustrating the base in a first inserted position relative to the mounting plate;

FIG. 40 is a rear perspective view of the mounting plate and base of the FDT assembly of FIG. 37, illustrating the base in a second inserted position relative to the mounting plate;

FIG. 41 is a side perspective view of the FDT assembly of FIG. 37, illustrating the connection of the cover to the base and mounting plate;

FIG. 42 is a rear perspective view of the assembled FDT assembly of FIG. 37;

FIG. 43 is a front perspective view of the assembled FDT assembly of FIG. 37;

FIG. 44 is a cut-away perspective view of the assembled FDT assembly of FIG. 37; and FIG. 45 is a schematic representation of the refractive index profile of a cross-section of the glass portion of an embodiment of a multimode optical fiber comprising a glass core and a glass cladding.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing optical connectivity between optical fibers of distribution cables and drop cables are described and shown in the accompanying drawings with regard to specific types of fiber drop terminals, also known as fiber distribution terminals, (collectively, "FDTs"), it is envisioned that the functionality of the various apparatus and methods may be applied to any now known or hereafter devised enclosures and related fiber optic network equipment in which it is desired to provide optical connections between optical fibers of any cables within the fiber optic network. Like numbers refer to like elements throughout.

With reference to FIGS. 1-36, various FDTs and associated equipment in accordance with some embodiments of the present invention are illustrated. As mentioned above, although these embodiments are described herein as being used as a network access point optical connection for distribution cable(s) and drop cables for multiple dwelling units ("MDUs"), it should be appreciated that the embodiments of the present invention may be used at alternative positions within the fiber optic network to connect any optical fibers within the network. Furthermore, although the illustrated embodiments are adapted for use within an MDU and do not include much of the standard features of outdoor hardware, further embodiments of the present invention include additional features, designs, components, and other functionalities adapted for use outside an MDU. As described more fully below, the illustrated embodiments of the present invention are described as using microstructured optical fiber; however, further embodiments of the present invention are adapted to include any alternative type of optical fiber. In addition, FDTs of certain embodiments of the present invention include many of the dimensional, functional, design, and other features of the fiber distribution terminals (also referred to as "FDTs" and which are generally synonymous with fiber drop terminals) disclosed in U.S. patent application Ser. No. 11/653,137 filed on Jan. 12, 2007, which is assigned to the present assignee and the disclosure of which is incorporated in its entirety by reference herein.

Turning now to the embodiment of FIGS. 1-11, an FDT adapted for use in a fiber optic network of an MDU is provided. The FDT 10 enables a technician to selectively optically connect at least one connectorized optical fiber of a distribution cable (not shown) to a connectorized optical fiber of at least one drop cable (not shown). The FDT comprises a base 12 defining a back wall 14 and a sidewall 16 extending outwardly from the back wall. The back wall 14 of the illustrated embodiment comprises a two-part back wall to allow convenient removal of some of the hardware therein, whereas further embodiments of the present invention may comprise any number of back wall(s). The base 12 of FIGS. 1-11 defines four openings 18 for passage of the distribution cables and two openings 20 for passage of the drop cables through the sidewall 16. The term "passage" for purposes of this patent application shall include the passing of continuous optical fibers of the respective cable and shall also include the passage of optical signals communicated through the optical fibers even though the actual fiber may be terminated and joined to a second optical fiber, such as in a connector-adapter interface, a connector-connector interface, or any other use of optical waveguides. Therefore, "passage" of the optical fiber or cable is not limited to situations where the actual fiber or cable pass into or out of the base; the optical signal need only pass into or out of the base for there to be "passage." Referring to FIG. 2, the openings 18 for passage of the distribution cables comprise a multi-fiber adapter 19a for receiving a multi-fiber connector of the distribution cable (not shown), whereas the openings 20 for passage of the drop cables comprise grommets that allow the drop cables to pass directly through. For the embodiment of FIG. 2, a fanout device 19b is provided to divide the optical fibers of the multi-fiber adapter 19a into individual optical fibers routed to the connectors of the distribution cables described below. Further embodiments of the present invention also provide openings in the back wall to allow passage of the distribution cable(s) and/or drop cables.

The FDT of FIGS. 1-11 also includes a cover 22 adapted to selectively connect to the sidewall 16 generally opposite the back wall 14; however, further embodiments of the present invention provide the cover at any location relative to the back wall. The FDT 10 of FIGS. 1-11 also comprises four pluralities of adapters 24 joined to the back wall 14, whereas further embodiments provide the plurality of adapters at any location relative to the base and/or cover. The adapters 24 are adapted to receive a connector 26 of the distribution cable and a connector 28 of the drop cable to optically connect the connectorized optical fiber of the distribution cable to the connectorized optical fiber of the drop cable. The pluralities of adapters 24 of FIGS. 1-11 are pivotably joined to the base 12 to provide convenient access to each of the adapters while also allowing a relatively large number of adapters (compared to prior art FDTs) to be provided within the FDT.

Turning again to the cover 22 of FIG. 1, the cover defines a perimeter that on the top, left, and right sides defines a generally inwardly-facing groove that is adapted to receive a generally outwardly-facing lip 30 of the base to thereby enable the cover to slideably engage the sidewall 16 of the base 12. Further embodiments of the present invention include alternative designs to provide a cover that may be selectively connected to the base and/or that is selectively rotatable relative to the base.

Referring now to the pluralities of adapters 24 of the FDT of FIGS. 1-11, the adapters 24 are connected with a vertical bar 32 that comprises a horizontal hinge 34 at a bottom end of the vertical bar and a latch 36 adapted to enable selective rotation of the plurality of adapters about a generally horizontal axis. The hinge 34 may permanently attach the adapters 24 to the base 12, or the hinge 34 may allow selective removal of the adapters from the base. The latch 36 of the illustrated embodiment comprises two prongs that may be squeezed together to allow passage through a narrow slot to disconnect the vertical bar, and the narrow slot may taper inwards so that the vertical bar may be connected without squeezing the prongs together. Still further embodiments of the present invention comprise alternative devices for providing selectively moveable pluralities of adapters.

The vertical bars 32 of FIG. 3 each connect to twelve SC adapters 24, whereas further embodiments of the present invention connect any number of fiber optic connectors and any style of optical connectors, including but not limited to LC, FC, MTP, and any other single or multiple fiber connectors for single-mode or multi-mode fiber. The adapters 24 define axes that are generally oriented along a plane that is generally parallel to the back wall of the base to allow the FDT 10 to have a generally low profile. Although the adapters 24 are illustrated as extending in a generally horizontal direction, further embodiments of the present invention provide the adapters in a generally vertical direction (such that the "vertical" bar becomes "horizontal"). Still further embodiments of the present invention include adapters with axes that extend in a generally orthogonal direction relative to the back wall of the base and/or in other orientations.

The FDT 10 includes four pluralities of adapters 24, with the first three adapters (in order of their ability to be moved to access the plurality of adapters behind) having hinges 34 and latches 36 as described above. Each plurality of adapters 24 is positioned a certain distance from the back wall 14 to allow each of the pluralities of adapters to be selectively moved by a technician. As shown in FIG. 7, the fourth plurality of adapters 24 includes a vertical bar 32 that is joined to the base 14 by a bracket 38 at each end of the vertical bar. The bracket 38 defines a slot 40 adapted to enable selective rotation of the plurality of adapters about a vertical axis. The slot 40 receives a standoff device 42, such as a pin, and allows the pin to be moved within the slot a certain distance and/or direction to enable the adapters 24 (and any connected connectors) to be rotated a sufficient amount to allow convenient access to the adapters without causing the minimum bend radius of the associated optical fiber to be compromised by engaging the back wall 14 or the like. FIG. 9 illustrates the plurality of adapters 24 in a rotated position.

Turning now to the embodiment of FIG. 12, the FDT 110 includes similar pluralities of adapters 124, but with alternative devices for allowing selective movement of the pluralities of adapters. The pluralities of adapters 124 include a vertical bar 132 and a hinge 134; however, the latch 136 comprises an opening for receiving a fastening device, such as a screw, nut/bolt combination, wire tie, or the like. FIGS. 13 and 14 illustrate rotation of the pluralities of adapters 124 about the hinge 134. The FDT 110 of FIGS. 12-15 also includes two splice trays 150 that are mounted to the base 112 to enable splicing an optical fiber of the drop cable to a connectorized pigtail (the connector 128 is part of the pigtail, which is not otherwise shown). The splice trays are of the type described in the concurrently filed U.S. patent application entitled "Fiber Optic Splice Trays" that is assigned to the present assignee and the disclosure of which is incorporated by reference in its entirety herein. The splice tray 150 of the illustrated embodiment includes a slot 152 to selectively receive a tab 154 protruding from the back wall 114 of the base 112 to enable selective mounting of the splice tray to the base. Still further embodiments of the present invention comprise alternative devices for mounting one or more splice trays to the base. Still further embodiments of the present invention include FDTs with splitter devices provided within the FDT and other fiber optic hardware as desired.

FIG. 16 provides an enlarge view of the grommets 160 and 162 provided in the openings 20 of the FDT 10 of FIGS. 1-11, and also provided on the FDT 110 of FIGS. 12-15. The grommet 160 comprises twelve openings 164 for passage of twelve individual drop cables (not shown), and the grommet 162 comprises twenty-four openings 164 for passage of twenty-four individual drop cables. The openings 164 include slots 166 so that the cables may be placed within in the grommet without passing an end of the drop cable (which may or may not have a connector attached to the end) through the hole, thus making installation of the grommet more convenient. Alternative embodiments of the present invention comprise alternative grommets for generally sealing and retaining the openings in the base and/or cover of the FDT that allow passage of the fiber optic cables.

FIGS. 17-20 illustrate a strain relief device 170 included in certain embodiments of the present invention. The strain relief device 170 is adapted for use with microstructured optical fibers, as described more fully below, based upon the ability of such fibers to withstand a greater compression without causing excessive signal loss within the fiber. The strain relief device 170 comprises a body 172 with a generally cylindrical shape that defines an axis generally aligned with the axis of the microstructured optical fibers 174 to be strain relieved. Along the perimeter of the body 172 are provided a plurality of slots 176 adapted to receive the microstructured optical fibers 174 (and any tubes, cables, or other assemblies associated therewith) such that a portion of the microstructured optical fibers is positioned radially outward of the perimeter of the body. Once the microstructured optical fibers are positioned within the slots 176 of the body 172, a compression device 178 is positioned around the body 172 and the microstructured optical fibers 174 to apply a force upon the microstructured optical fibers to strain relieve the optical fibers. The body 170 defines a circumferential slot 180 adapted to receive the compression device 178. The slot 178 defines at least one shoulder 182 to prevent axial movement of the compression device 178. The compression device 178 of the illustrated embodiment comprises a wire tie device; however, further embodiments of the present invention comprise alternative compression devices to retain and/or seal the optical fibers to the strain relief device. As shown in FIG. 17, the FDT 10 or other enclosure into which the strain relief device 170 is installed may include a spring clip 184 mounted to a surface (such as the back wall 14) to selectively retain the strain relief device relative to the FDT or other enclosure. Further embodiments of the present invention include alternative devices for retaining the strain relief device relative to the fiber optic enclosure.

Turning now to FIGS. 21-24, the FDT 210 is yet another embodiment of the present invention that provides selective optical connectivity for connectorized optical fibers of a distribution cable and connectorized optical fibers of drop cables. The FDT comprises a base 212 defining a back wall 214 and a sidewall 216 extending outwardly from the back wall similar to the embodiment of FIG. 1. The FDT 210 also includes a plurality of adapters 224 joined to the base 212, and includes a distribution cover 250 between the back wall 214 of the base 212 and the cover 222. The distribution cover 250 is adapted to provide limited access to the portion of the adapters 224 that receive a connector 226 of the distribution cable. The distribution cover 250 of some embodiments of the present invention includes a lock device, such as a fastener with an uncommon feature, a padlock, or the like, to allow access under the distribution cover to only limited individuals, such as technicians working on behalf of the service provider, thus preventing tampering with the optical connections by customers, vandals, or others.

Although not shown in FIGS. 21-24, the FDT 210 includes grommets or similar devices in the openings 218 and 220, and may include a fanout positioned between the distribution cover and the base to optically connect the optical fiber of the distribution cable with the portion of the adapters that receive a connector 226 of the distribution cable. The plurality of adapters 224 of the FDT 210 are illustrated in a fixed position relative to the base 212 of the FDT; however, further embodiments of the present invention may include additional or alternative features to allow the plurality of adapters to be moved as desired.

Turning now to FIGS. 25-38, an FDT in accordance with yet another embodiment of the present invention is illustrated. The FDT 310 defines a generally curved top and front surface (on both the cover 322 and sidewalls 316 of the base 312). The FDT 310 also includes a bracket 332 that is selectively movable relative to the base 312 and to which are joined two pluralities of adapters 324. The bracket 332 is selectively removable from the base 312, as shown in FIG. 26, and is selectively rotatable relative to the base 312, as shown in FIG. 27. The bracket 332 comprises a polymer or other moderately flexible material to allow sufficient bending, when a force is exerted upon the bracket by a technician with his or hand or with a tool or the like, to cause the bracket 332 to become detached at one or more attachment points. As shown in FIGS. 25-27, the bracket 332 is attached to the base 312 at four points with pins 333a that are received in openings 333b on protrusions from the base. Therefore, a technician can detach all four pins 333a to selectively remove the bracket 333, or detach the two top pins 333a to selective rotate the bracket about a horizontal axis, or the like. Further embodiments of the present invention include additional brackets attached/detached by alternative devices that may be removed and/or rotated in alternative directions.

The two pluralities of adapters 324 each define axes of the adapters therein, and the FDT 310 of FIG. 25 includes pluralities of adapters 324 that are slightly angled relative to one another to enable convenient access to one or both sides of the adapters. Further embodiments of the present invention include alternative numbers of adapters at alternative relative positions and/or orientations. As shown in FIGS. 28-32, the FDT 310 includes a cover 322 that is generally domed shape. The cover 322 of FIGS. 31 and 32 comprises a latch device 323a on each side of the cover generally near the bottom of the cover to selectively retain the cover relative the base. The base 312 of an FDT (as shown in FIG. 34) is adapted to receive the cover 322 of FIGS. 31 and 32 includes an opening 323b for each latch device 323a to selective receive the latch device and retain the cover relative to the base.

Turning now to FIGS. 33 and 34, a top view of the sidewall 316 of the FDT 310 is provided. As can be seen, the opening 318 for passage of the distribution cable (not shown) can include an adapter 319a. The openings 320a for the drop cables may include grommets 360 as shown in FIG. 33. Alternatively, as shown in FIG. 34, the openings 320b may define one or more slots adapted to allow passage of two or more drop cables. The slot defines at least one opened portion 320c sized to allow passage of the connector of the drop cable, and the slot further defines other portions 320d and 320e sized to allow passage of the drop cable alone. Still further embodiments of the present invention comprise alternative openings and structures for providing secure and convenient passage of the optical fibers and/or cables into the FDT.

Referring now to FIGS. 35 and 36, a strain relief device 370 is provided to strain relieve and seal a distribution cable through an opening 318 within the FDT. The strain relief device comprises a generally frustoconical device that includes three ribs 371 along the frustoconical surface 373. The ribs 371 enable the strain relief device 370 to be better retained within the opening 318 (as compared to similar devices without ribs), and the frustoconical surface 373 enables the strain relief device to be wedged within the opening to provide a sufficient seal and/or sufficient strain relief. The strain relief device 370 includes a slit along the axial length of the strain relief device to provide convenient receipt of the cable within the strain relief device. Still further embodiments of the present invention include alternative strain relief devices.

Turning now to the FDT assembly of FIGS. 37-44, an FDT assembly 400 comprising an FDT 410 having a base 412 and a cover 422 and adapted to receive a bracket with at least one plurality of adapters, such as a bracket 332 of FIG. 25. The FDT assembly 400 of FIGS. 37-44 also comprises a mounting plate 415 for selectively mounting the FDT to a generally vertical surface, such as a wall to provide one non-limiting example, in a MDU or within our outside any other type of building or structure. The mounting plate enables a technician to conveniently mount the FDT to the generally vertical surface without the fiber optic cable and/or adapters getting in the way, which could lead to improper mounting of the FDT and/or to damage to the fiber optic components. Still other advantages, such as security from unauthorized access, are provided by the mounting plate of the present invention. The mounting plate of the illustrated embodiment comprises a molded polymer material, which includes both thermoplastics and thermosets, and examples of polymer material include, but are not limited to PVC, polycarbonate, polyethylene, polypropylene, acrylic, fluorocarbons, and the like. Still further embodiments of the present invention include mounting plates of alternative and/or additional materials.

The mounting plate 415 comprises a first surface 417 adapted to selectively engage the FDT 410. The first surface 417 defines a generally planar surface that is substantially parallel with the back wall of the base 412 of the FDT 410 when the base is selectively retained by the mounting plate 415. Also, when the mounting plate 415 is selectively mounted to a generally vertical surface (not shown) the first surface defines a generally vertical orientation. However, further embodiments of the present invention may mount to the FDT assembly to surfaces of any orientation. Furthermore, although all illustrations of the embodiments of FIGS. 37-44 are shown with the openings facing downward, it should be appreciated that further embodiments of the present invention include mounting the FDT assembly 400 at any rotational direction, including, but not limited to, having the openings facing upward, to the side, or at any angle, depending upon the requirements of the particular location.

The first surface 417 includes at least one retention device 419 to enable the FDT 410 to be selectively retained by the mounting plate 415. The retention device 419 of the illustrated embodiment comprises an aperture in the first surface 417; however, further embodiments of the present invention comprise alternative retention devices including slots, keyholes, hooks, shoulders, tabs, and the like. The aperture of the retention device 419 of FIGS. 37-44 comprises a first opening 421 and a second opening 423 contiguous to the first opening. The second opening 423 is smaller than the first opening. The first opening 421 is sized to receive an offset protrusion 425 of the base 412 of the FDT 410, and the second opening 423 is sized to receive only the offsetting portion 427 of the protrusion 425, by sliding the base downward, relative to the mounting plate, after the protrusion is received within the first opening 421. Still further embodiments of the present invention comprise alternative retention devices and/or protrusions for selectively retaining the base and/or FDT to the mounting plate. Turning again to the first opening 421 of the retention device 419, the perimeter of the first opening comprises a lead-in portion 429 to facilitate easier insertion of the protrusion 425 into the first opening and thus the selective retention of the base of the FDT to the mounting plate. The lead-in portion 429 of the illustrated embodiment comprises a chamfer substantially along the perimeter of the first opening 421; however, further embodiments of the present invention comprise alternative lead-in portions. The mounting plate 415 also includes an additional retention device that comprises a locking device 431 that enables selective locking of the FDT to the mounting plate. The locking device 431 is adapted to selectively receive a latch device 433 of the cover 422 to selectively retain the cover to the mounting plate 415. Further embodiments of the present invention comprise alternative structures for selectively retaining the cover to the mounting plate.

The mounting plate 415 also comprises four fastening portions 435 joined to the first surface. The fastening portions 435 enable the mounting plate 415 to be selectively fastened to the generally vertical surface using one or more fasteners (not shown) that are passed through an opening in the fastening portion 435. The fastening portions 435 include surfaces for engaging the generally vertical surface and include an opening adapted to allow passage of a fastener that is selectively fastened to the generally vertical surface. The fastener of the various embodiments of the present invention comprise any suitable fastener, including but not limited to screws, bolts with or without nuts, nails, rivets, and other fasteners. Still further embodiments include fastening portions adapted for use with alternative mounting devices such as adhesives, hook and loop systems, magnets, and the like to list a few non-limiting examples. Turning again to the fastening portions 435 of the illustrated embodiment, the fastening portions comprise an opening proximate a top edge, a bottom edge, a right edge and a left edge of the first surface 417 of the mounting plate 415. Further embodiments of the FDT assembly include mounting plates with fastening portions at additional and/or alternative locations of the mounting plate.

The mounting plate 415 of FIGS. 37-44 is structured and arranged to prevent dismounting of the mounting plate from the generally vertical wall without prior removal of at least a portion of the FDT from the mounting plate. The mounting plate 415 is structure and arranged such that the cover 422 and the base 412 must be removed from the mounting plate in order for the technician to have access to the fastening portions in order to remove the respective fasteners to dismount the mounting plate. The mounting plate 415 provides an interlock to the various components of the FDT assembly 400. More specifically, in order for the mounting plate 415 to be dismounted, the base 412 must be removed by sliding the base upward and outward to disengage the protrusions 425 from the retention devices 419. When the cover 422 is selectively joined to the base 412, the latch device 433 is selectively received in the locking device 431 such that the base 412 may not be slid upward to disengage the protrusions 425 from the retention device. A technician may join the cover 422 to the base 412 with a locking fastener (not shown) that is threaded into a receptacle 441 on the base 412. The locking fastener is a hex-head bolt of the type commonly used by technicians to securely lock fiber optic closures to prevent unauthorized tampering with the closures. Further embodiments of the present invention include alternative locking fasteners, including, but not limited to bolts with heads having more or less sides than six. The locking fastener therefore allows only authorized technicians the ability to remove the cover from the base, thus allowing the base to be removed from the mounting plate, and then allowing the mounting plate to be removed from the generally vertical surface. Therefore, the FDT assembly of the present invention provides secure mounting of the FDT.

As discussed above with respect to similar embodiments of the present invention, the cover 422 includes openings 423a on each side of the cover generally near the bottom of the cover to selectively retain the cover relative the base 412. The base 412 is adapted to receive the cover 422 includes latch devices 423b for selective receipt within the respective opening 423a to retain the cover relative to the base. Still further embodiments of the present invention comprise alternative devices for selectively retaining the cover relative to the base. The base 412 also includes openings 420 and 418 for passage of the drop cables and/or distribution cable similar to the embodiments of the present invention described above. Furthermore, the base 412 includes a sleeve 443 for the passage of the distribution cable that accommodates a heat shrink to seal and/or protect the passage of the distribution cable into the FDT.

Additional embodiments of the present invention comprise methods for selectively mounting an FDT assembly 400 to a generally vertical wall. The mounting plate 415 is mounted to the generally vertical surface using fasteners or the like. The base 412 is then retained to the mounting plate by inserting the protrusions 425 into the retention devices 419. Next, the cover 422 is joined to the base by the latch devices 423a and is joined to the mounting plate 415 with the latch device 433. Finally, a locking fastener 441 is threaded through the cover 422 into a receptacle 443 on the base 412. Therefore, the mounting plate 415 is prevented from selective dismounting without prior removal of both the cover 422 and the base 412. Still further embodiments of the present invention comprise alternative methods for installing (and reverse methods for uninstalling) the FDT assemblies of the respective embodiments of the present invention.

Various embodiments of the present invention are adapted to include bend performance optical fibers. One example of bend performance optical fiber is a microstructured optical fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments of the present invention, the microstructured optical fibers disclosed herein comprises a core region disposed about a longitudinal centerline and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", it is meant that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. In some embodiments, the core region comprises a single core segment having a positive maximum refractive index relative to pure silica $\Delta_1$ in %, and the single core segment extends from the centerline to a radius R1. In one set of embodiments, 0.30%<$\Delta_1$<0.40%, and 3.0 μm<R1<5.0 μm. In some embodiments, the single core segment has a refractive index profile with an alpha shape, where alpha is 6 or more, and in some embodiments alpha is 8 or more. In some embodiments, the inner annular hole-free region extends from the core region to a radius R2, wherein the inner annular hole-free region has a radial width W12, equal to R2–R1, and W12 is greater than 1 μm. Radius R2 is preferably greater than 5 μm, more preferably greater than 6 μm. The intermediate annular hole-containing region extends radially outward from R2 to radius R3 and has a radial width W23, equal to R3–R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region and the cladding region are preferably comprised of silica. The core region is preferably silica doped with one or more dopants. Preferably, the core region is hole-free. The hole-containing region has an inner radius R2 which is not more than 20 μm. In some embodiments, R2 is not less than 10 μm and not greater than 20 μm. In other embodiments, R2 is not less than 10 μm and not greater than 18 μm. In other embodiments, R2 is not less than 10 μm and not greater than 14 μm. Again, while not being limited to any particular width, the hole-containing region has a radial width W23 which is not less than 0.5 μm. In some embodiments, W23 is not less than 0.5 μm and not greater than 20 μm. In other embodiments, W23 is not less than 2 μm and not greater than 12 μm. In other embodiments, W23 is not less than 2 μm and not greater than 10 μm.

Such fiber can be made to exhibit a fiber cutoff of less than 1400 nm, more preferably less than 1310 nm, a 20 mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and a 8 mm macrobend induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

The fiber of some embodiments of the present invention comprises a core region that is surrounded by a cladding region that comprises randomly disposed voids which are contained within an annular region spaced from the core and positioned to be effective to guide light along the core region. Other optical fibers and microstructured fibers may be used in the present invention. Additional features of the microstructured optical fibers of additional embodiments of the present invention are described more fully in pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; and 60/841,490 filed Aug. 31, 2006; all of which are assigned to Corning Incorporated and the disclosures of which are incorporated by reference herein.

Still further embodiments of the present invention comprise fiber optic cables comprising bend resistant multimode optical fibers which comprise a graded-index core region and a cladding region surrounding and directly adjacent to the core region, the cladding region comprising a depressed-index annular portion comprising a depressed relative refractive index, relative to another portion of the cladding (which preferably is silica which is not doped with an index of refraction altering dopant such as germania or fluorine). Preferably, the refractive index profile of the core has a parabolic shape. The depressed-index annular portion may comprise glass comprising a plurality of holes, fluorine-doped glass, or fluorine-doped glass comprising a plurality of holes. The depressed index region can be adjacent to or spaced apart from the core region.

In some embodiments that comprise a cladding with holes, the holes can be non-periodically disposed in the depressed-index annular portion. By "non-periodically disposed" or "non-periodic distribution", we mean that when viewed in cross section (such as a cross section perpendicular to the longitudinal axis) of the optical fiber, the non-periodically disposed holes are randomly or non-periodically distributed across the hole containing region. Cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically located within the fiber structure. These holes are stretched (elongated) along the length (i.e. parallel to the longitudinal axis) of the optical fiber, but do not extend the entire length of the entire fiber for typical lengths of transmission fiber.

The multimode optical fiber disclosed herein exhibits very low bend induced attenuation, in particular very low macrobending. In some embodiments, high bandwidth is provided by low maximum relative refractive index in the core, and low bend losses are also provided. In some embodiments, the core radius is large (e.g. greater than 20 μm), the core refractive index is low (e.g. less than 1.0%), and the bend losses are low. Preferably, the multimode optical fiber disclosed herein exhibits a spectral attenuation of less than 3 dB/km at 850 nm.

The numerical aperture (NA) of the optical fiber is preferably greater than the NA of the optical source directing signals into the fiber; for example, the NA of the optical fiber is preferably greater than the NA of a VCSEL source. The bandwidth of the multimode optical fiber varies inversely with the square of $\Delta 1_{MAX}$. For example, a multimode optical fiber with $\Delta 1_{MAX}$ of 0.5% can yield a bandwidth 16 times greater than an otherwise identical multimode optical fiber except having a core with $\Delta 1_{MAX}$ of 2.0%.

In some embodiments, the core extends radially outwardly from the centerline to a radius R1, wherein $12.5 \leq R1 \leq 40$ microns. In some embodiments, $25 < R1 < 32.5$ microns, and in some of these embodiments, R1 is greater than or equal to about 25 microns and less than or equal to about 31.25 microns. The core preferably has a maximum relative refractive index, less than or equal to 1.0%. In other embodiments, the core has a maximum relative refractive index, less than or equal to 0.5%. Such multimode fibers preferably exhibit a 1 turn 10 mm diameter mandrel attenuation increase of no more than 1.0 dB, preferably no more than 0.5 dB, more preferably no more than 0.25 dB, even more preferably no more than 0.1 dB, and still more preferably no more than 0.05 dB, at all wavelengths between 800 and 1400 nm.

If non-periodically disposed holes or voids are employed in the depressed index annular region, it is desirable for the holes to be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fiber disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

FIG. 45 shows a schematic representation of the refractive index profile of a cross-section of the glass portion of an embodiment of a multimode optical fiber comprising a glass core 520 and a glass cladding 500, the cladding comprising an inner annular portion 530, a depressed-index annular portion 550, and an outer annular portion 560. In the embodiment illustrated in FIG. 45, the outer annular portion 560 has a substantially constant refractive index profile, as shown in FIG. 45 with a constant $\Delta 4(r)$; in some of these embodiments, $\Delta 4(r)=0\%$. The "relative refractive index percent" is defined as $\Delta \% = 100 \times (n_i^2 - n_{REF}^2)/2n_i^2$. The relative refractive index percent is measured at 850 nm unless otherwise specified. In the embodiment illustrated in FIG. 45, the reference index $n_{REF}$ is the refractive index of inner annular portion 530. The core 520 is surrounded by and in direct contact with the inner annular portion 530, which has a substantially constant refractive index profile $\Delta 2(r)$. The inner annular portion 530 is surrounded by and in direct contact with the depressed-index annular portion 550 having refractive index profile $\Delta 3$, and the depressed-index annular portion 550 is surrounded by and in direct contact with the outer annular portion 560, which has a substantially constant refractive index profile $\Delta 4(r)$.

The core 520 has an entirely positive refractive index profile, where $\Delta 1(r) > 0\%$. In some embodiments, the inner annular portion 530 has a relative refractive index profile $\Delta 2(r)$ having a maximum absolute magnitude less than 0.05%, and $\Delta 2_{MAX} < 0.05\%$ and $\Delta 2_{MIN} > -0.05\%$, and the depressed-index annular portion 550 begins where the relative refractive index of the cladding first reaches a value of less than −0.05%, going radially outwardly from the centerline. In some embodiments, the outer annular portion 60 has a relative refractive index profile $\Delta 4(r)$ having a maximum absolute magnitude less than 0.05%, and $\Delta 4_{MAX} < 0.05\%$ and $\Delta 4_{MIN} > -0.05\%$, and the depressed-index annular portion 550 ends where the relative refractive index of the cladding first reaches a value of greater than −0.05%, going radially outwardly from the radius where $\Delta 3MIN$ is found. In some embodiments, the inner annular portion 530 comprises pure silica. In some embodiments, the outer annular portion 560 comprises pure silica. In some embodiments, the depressed-index annular portion 550 comprises pure silica comprising with a plurality of holes. Preferably, the minimum relative refractive index, or average effective relative refractive index, such as taking into account the presence of any holes, of the depressed-index annular portion 550 is preferably less than −0.1%. The holes can contain one or more gases, such as argon, nitrogen, or oxygen, or the holes can contain a vacuum with substantially no gas; regardless of the presence or absence of any gas, the refractive index in the annular portion 550 is lowered due to the presence of the holes. The holes can be randomly or non-periodically disposed in the annular portion 550 of the cladding 500, and in other embodiments, the holes are disposed periodically in the annular portion 550. In some embodiments, the plurality of holes comprises a plurality of non-periodically disposed holes and a plurality of periodically disposed holes. Alternatively, or in addition, the depressed index in annular portion 550 can also be provided by downdoping the annular portion 550 (such as with fluorine) or updoping one or more portions of the cladding and/or the core, wherein the depressed-index annular portion 550 is, for example, pure silica or silica which is not doped as heavily as the inner annular portion 530.

Preferably, the inner annular portion 530 has a radial width of greater than 4 microns. In some embodiments, the minimum relative refractive index of the depressed-index annular portion 550, $\Delta 3MIN$, is less than −0.10%; in other embodiments, $\Delta 3MIN$ is less than −0.20%; in still other embodiments, $\Delta 3MIN$ is less than −0.30%; in yet other embodiments, $\Delta 3MIN$ is less than −0.40%.

$\Delta 1_{MAX}$ is preferably less than or equal to 2.0%, more preferably less than or equal to 1.0%, even more preferably less than 1.0%, and still more preferably less than or equal to 0.8%; in some embodiments $\Delta 1_{MAX}$ is greater than or equal to 0.4% and less than or equal to 1.0%, and in other embodiments $\Delta 1_{MAX}$ is greater than or equal to 0.5% and less than or equal to 0.75%.

The numerical aperture (NA) of the optical fiber is preferably greater than the NA of the optical source directing signals into the fiber; for example, the NA of the optical fiber is preferably greater than the NA of a VCSEL source. The bandwidth of the multimode optical fiber varies inversely with the square of $\Delta 1_{MAX}$. For example, a multimode optical fiber with $\Delta 1_{MAX}$ of 0.5% can yield a bandwidth 16 times greater than an otherwise identical multimode optical fiber except having a core with $\Delta 1_{MAX}$ of 2.0%.

In some embodiments, the core outer radius, $R_1$, is preferably not less than 12.5 μm and not more than 40 μm, i.e. the core diameter is between about 25 and 80 μm. In other embodiments, R1>20 microns; in still other embodiments, R1>22 microns; in yet other embodiments, R1>24 microns.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. A method of installing a fiber drop terminal ("FDT") assembly to a generally vertical surface, the FDT assembly adapted for use in a fiber optic network of a multiple dwelling unit to selectively optically connect at least one connectorized optical fiber of a distribution cable to a connectorized optical fiber of at least one drop cable, the method comprising:
   providing the FDT assembly comprising a base, a cover, at least one plurality of adapters joined to at least one of the base and the cover, and a mounting plate;
   mounting the mounting plate to the generally vertical surface, wherein the mounting plate is selectively mountable; and
   retaining at least one of the base and the cover of the FDT assembly to the mounting plate, wherein the at least one of the base and the cover is selectively retained by the mounting plate, and wherein dismounting of the mounting plate is prevented without prior removal of at least one of the cover and the base from the mounting plate, and wherein the prior removal of the base from the mounting plate is prevented without prior disconnection of the cover from the base.

2. The method of claim 1, wherein retaining at least one of the base and the cover of the FDT assembly to the mounting plate comprises inserting a protrusion of the base into an aperture of the mounting plate.

3. The method of claim 1, further comprising locking at least one of the cover and the base comprises:
   inserting at least one latch device of the cover into a locking feature of the mounting plate; and
   locking the cover to the base with a locking fastener.

4. The method of claim 1, wherein the adapters are adapted to receive a connector of the distribution cable and a connector of the drop cable to optically connect the connectorized optical fiber of the distribution cable to the connectorized optical fiber of the at least one drop cable.

5. The method of claim 1, wherein the base defines a back wall and at least one sidewall extending outwardly from the back wall, wherein the base defines at least one opening for passage of the distribution cable and the drop cable through at least one of the back wall and sidewall.

6. The method of claim 1, wherein the mounting plate comprises at least one retention device to enable the at least one of the base and the cover of the FDT assembly to be selectively retained by the mounting plate.

7. The method of claim 1, wherein the mounting plate comprises at least one fastening portion that enables the mounting plate to be selectively mountable to the generally vertical surface.

* * * * *